(12) United States Patent
Toyohara et al.

(10) Patent No.: US 12,380,538 B2
(45) Date of Patent: Aug. 5, 2025

(54) APPARATUS FOR ESTIMATING DEFOCUSING OF IMAGE, METHOD THEREOF, AND NON-TRANSITORY COMPUTER-READABLE STORAGE MEDIUM

(71) Applicant: CANON KABUSHIKI KAISHA, Tokyo (JP)

(72) Inventors: Yohei Toyohara, Kanagawa (JP); Kenji Onuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 17/737,818

(22) Filed: May 5, 2022

(65) Prior Publication Data

US 2022/0366542 A1 Nov. 17, 2022

(30) Foreign Application Priority Data

May 14, 2021 (JP) .................... 2021-082168

(51) Int. Cl.
*G06T 5/00* (2024.01)
*G06T 5/70* (2024.01)
(Continued)

(52) U.S. Cl.
CPC ............. *G06T 5/70* (2024.01); *H04N 23/62* (2023.01); *H04N 23/675* (2023.01)

(58) Field of Classification Search
CPC ............ H04N 23/672; H04N 23/673; H04N 25/704; H04N 25/134; H04N 23/67; H04N 23/663; H04N 23/611; H04N 23/675; H04N 25/60; H04N 23/959; H04N 23/633; H04N 23/60; H04N 23/667; H04N 23/62; H04N 1/32144; H04N 2201/3205; H04N 2201/3233; H04N 25/611; H04N 23/69; H04N 23/71; H04N 25/61; H04N 25/778; H04N 1/00127; H04N 1/00331; G06V 20/00; G06V 30/142; G06V 10/25; G06V 10/40; G06V 20/10; G06V 10/10;
(Continued)

(56) References Cited

U.S. PATENT DOCUMENTS 9,100,568 B2* 8/2015 Suzuki .................. G03B 13/36
2007/0247622 A1* 10/2007 Sun ........................ G01N 21/21
356/364

(Continued)

FOREIGN PATENT DOCUMENTS

JP  2005012403 A   1/2005
JP  2009253936 A  10/2009
(Continued)

*Primary Examiner* — Quan M Hua
(74) *Attorney, Agent, or Firm* — Canon U.S.A., Inc. IP Division

(57) ABSTRACT

An apparatus includes at least one memory configured to store instructions, and at least one processor in communication with the at least one memory and configured to execute the instructions to set an estimation area to acquired image data, execute calculation for estimating a degree of defocusing of an image in the estimation area, determine defocusing of the image data based on the estimated degree of defocusing, and display information which allows a user to adjust a threshold for determining defocusing on a display.

12 Claims, 23 Drawing Sheets

(51) Int. Cl.
*H04N 23/62* (2023.01)
*H04N 23/67* (2023.01)

(58) Field of Classification Search
CPC ...... G06V 10/75; G06V 10/764; G06V 20/49;
G06V 20/58; G06V 20/588; G06V 40/10;
G06V 40/161; G06V 10/12; G06V
10/141; G06V 10/20; G06V 10/267;
G06V 10/273; G06V 10/28; G06V 10/88;
G06V 20/56
See application file for complete search history.

(56) References Cited

U.S. PATENT DOCUMENTS

| | | | | |
|---|---|---|---|---|
| 2013/0182172 | A1* | 7/2013 | Suzuki | G03B 13/36 |
| | | | | 348/345 |
| 2020/0275034 | A1* | 8/2020 | Takamiya | H04N 23/633 |
| 2022/0191401 | A1* | 6/2022 | Asukabe | H04N 23/60 |

FOREIGN PATENT DOCUMENTS

| | | | | |
|---|---|---|---|---|
| JP | 2009260622 | A | | 11/2009 |
| JP | 2013192227 | A | | 9/2013 |
| JP | 2017219786 | A | * | 12/2017 |
| JP | 2018031916 | A | | 3/2018 |
| JP | 2020092372 | A | | 6/2020 |

* cited by examiner

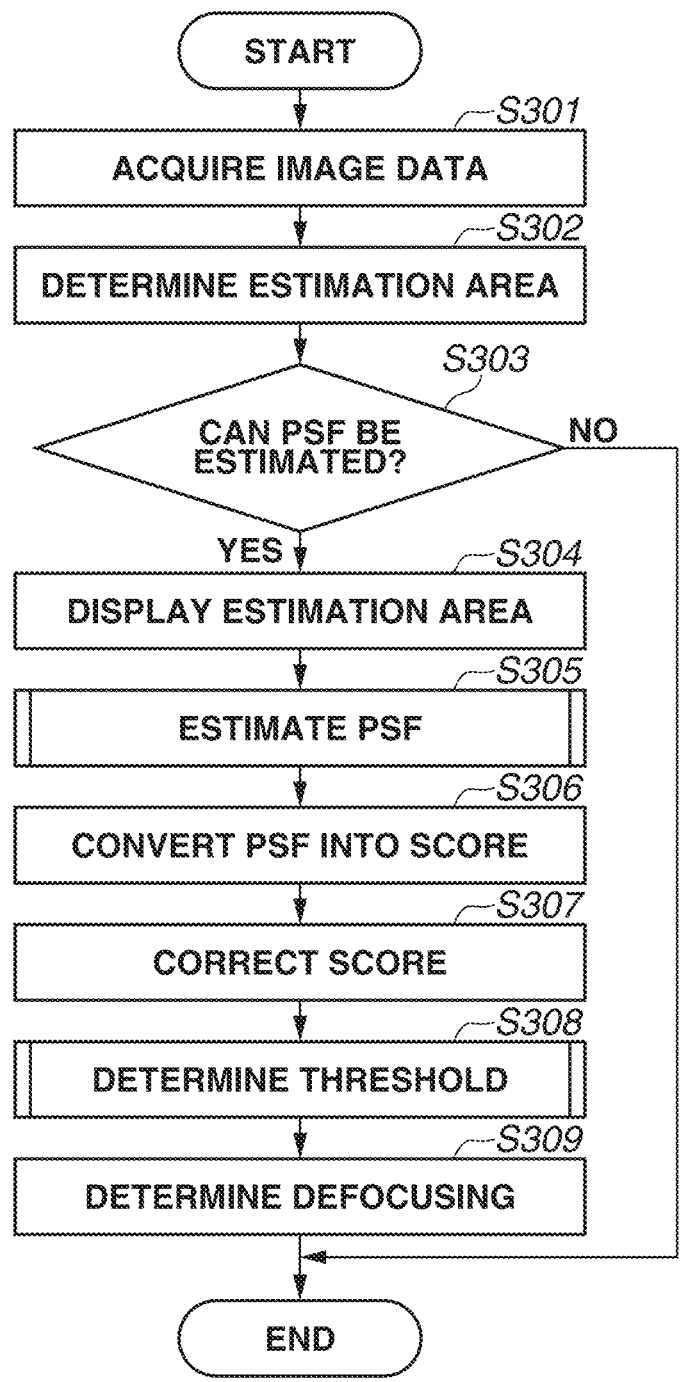

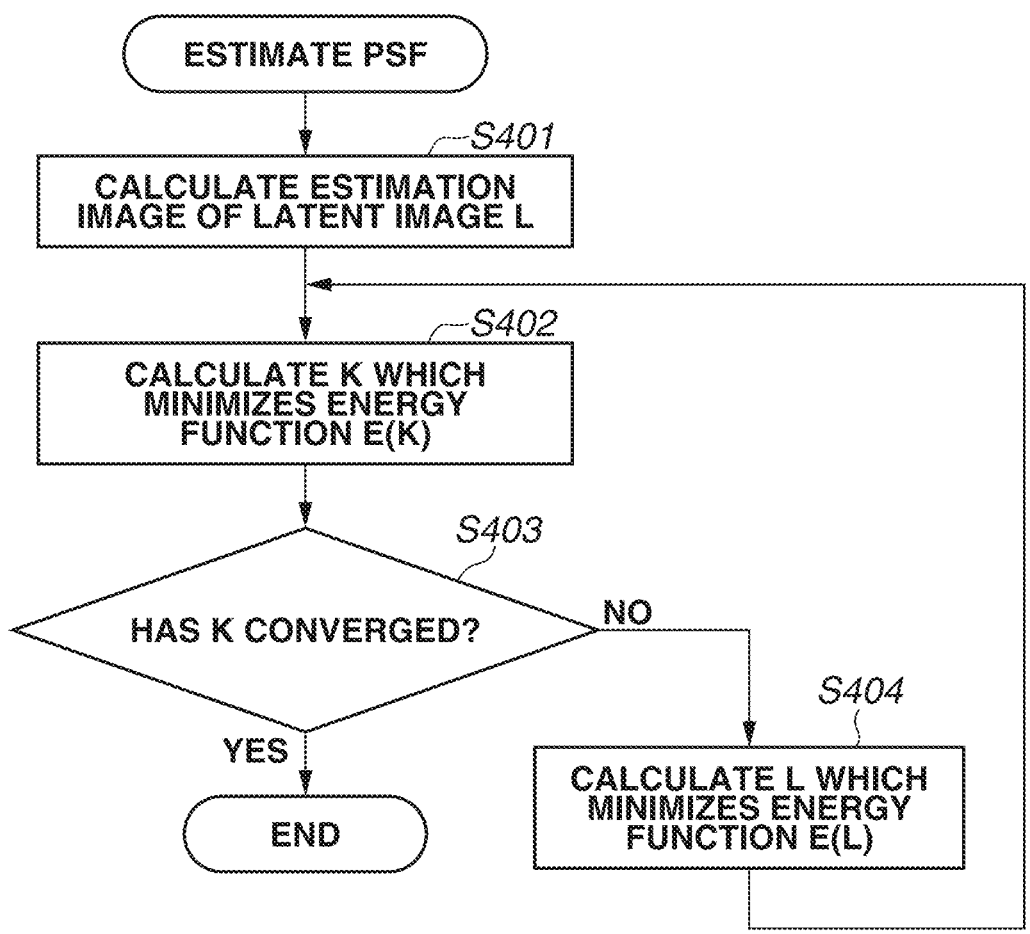

FIG.9A

```
▶ A6    POSTCARD
  A5    HANDOUT
  A4    HANDOUT
  A3    BROCHURE
  A2    POSTER
  A1    POSTER
  AUTOMATIC
```

FIG.9B

| OUTPUT SIZE | THRESHOLD |
|---|---|
| A6    POSTCARD | 4000 |
| A5    HANDOUT | 3500 |
| A4    HANDOUT | 3000 |
| A3    BROCHURE | 2500 |
| A2    POSTER | 2000 |
| A1    POSTER | 1500 |
| AUTOMATIC | 1500 |

FIG.10
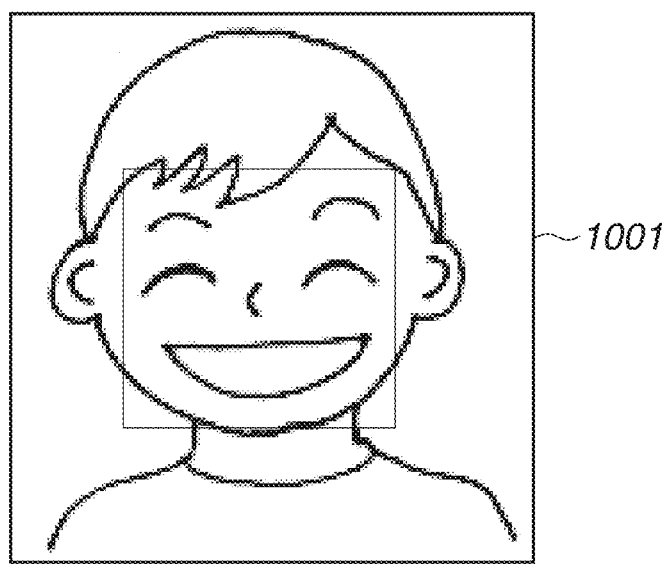
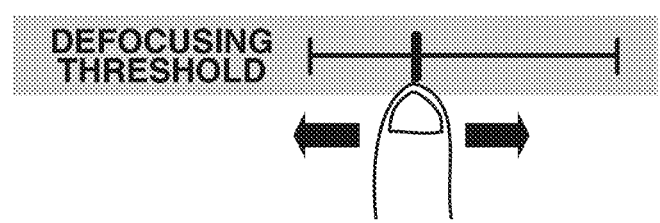

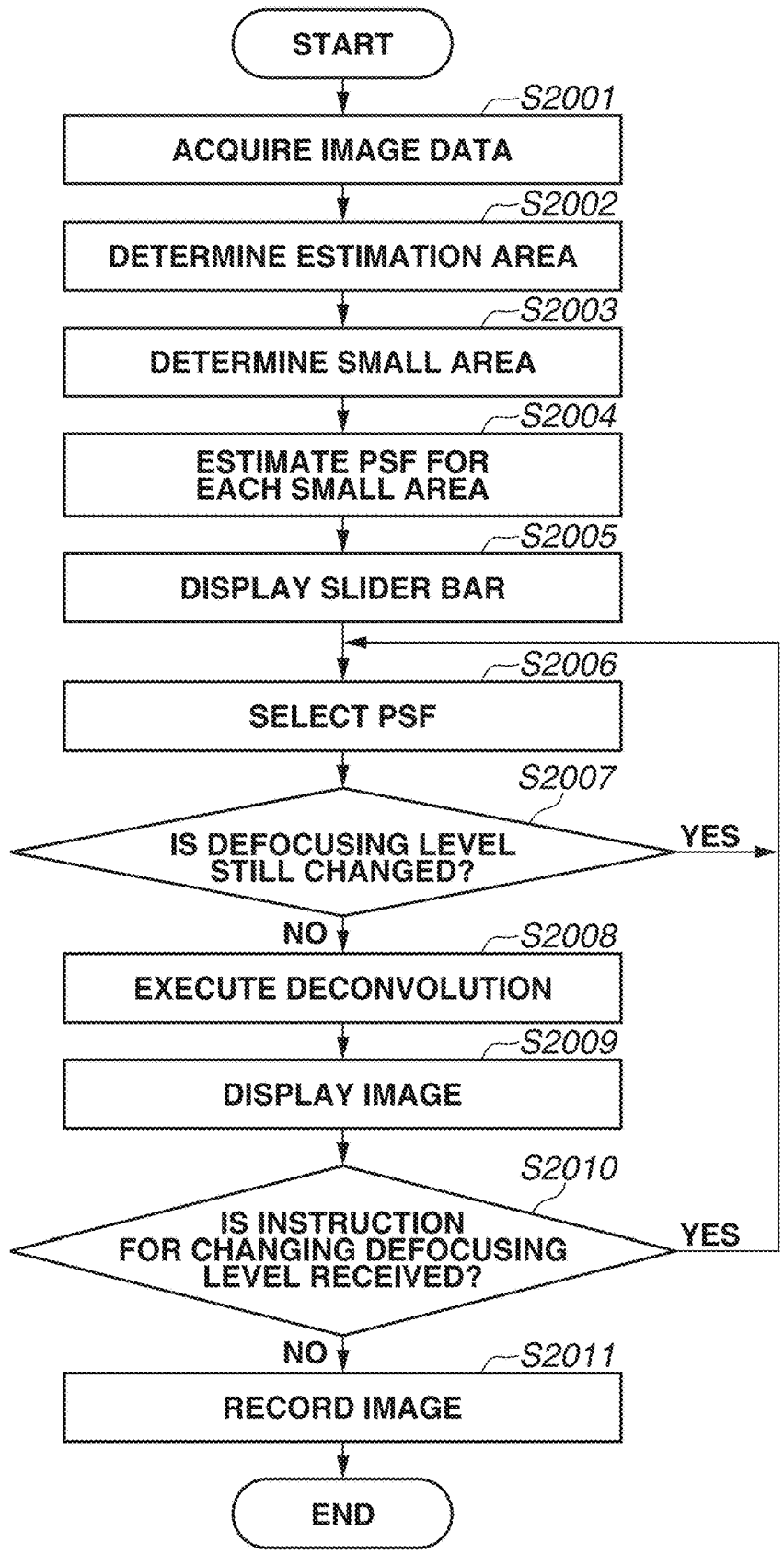

FIG.21
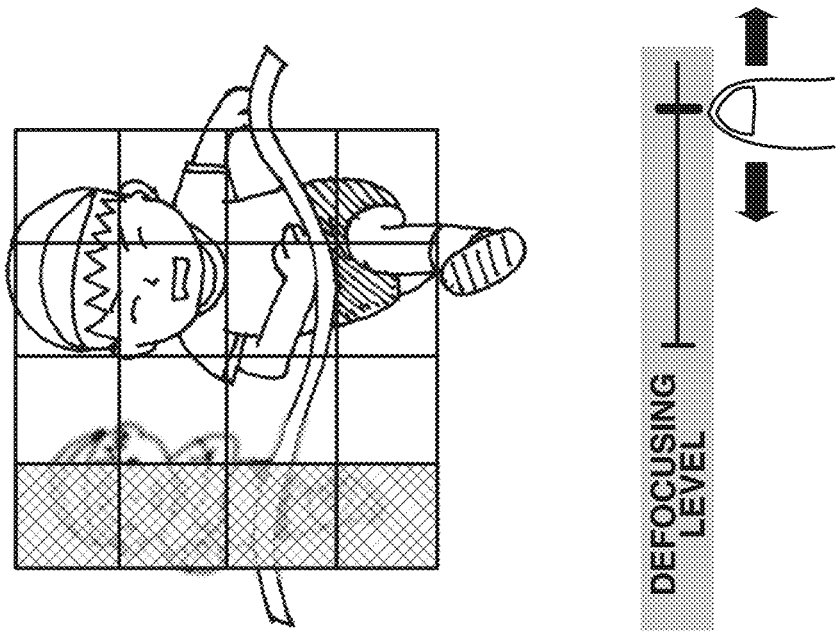
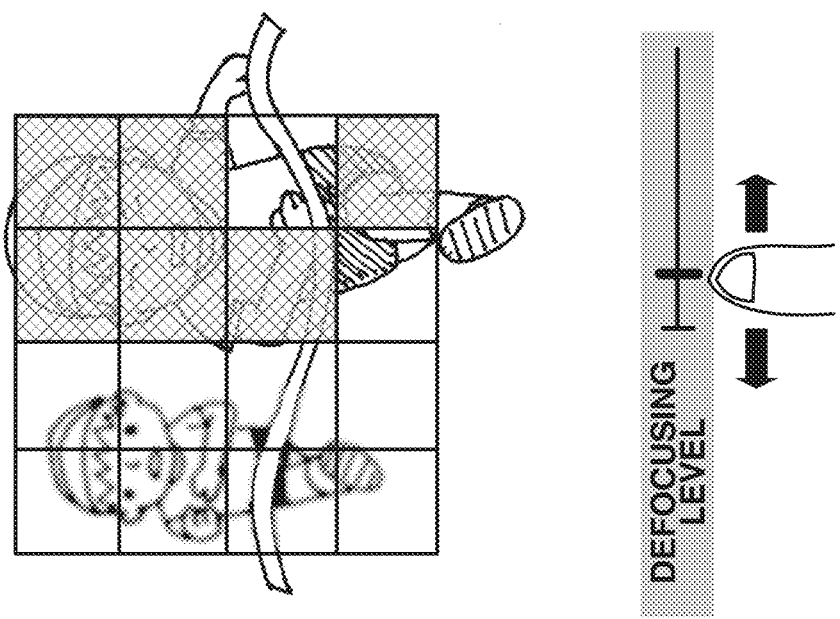

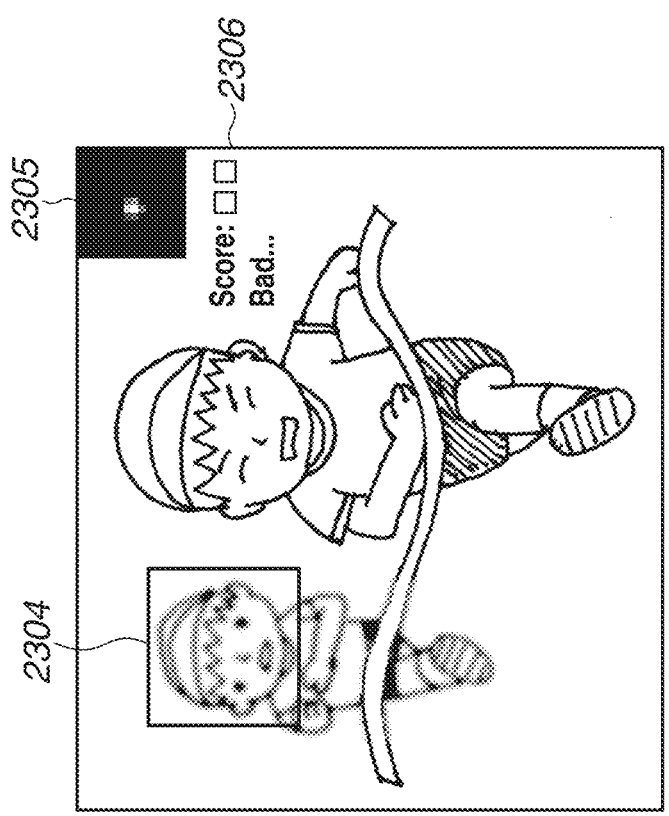
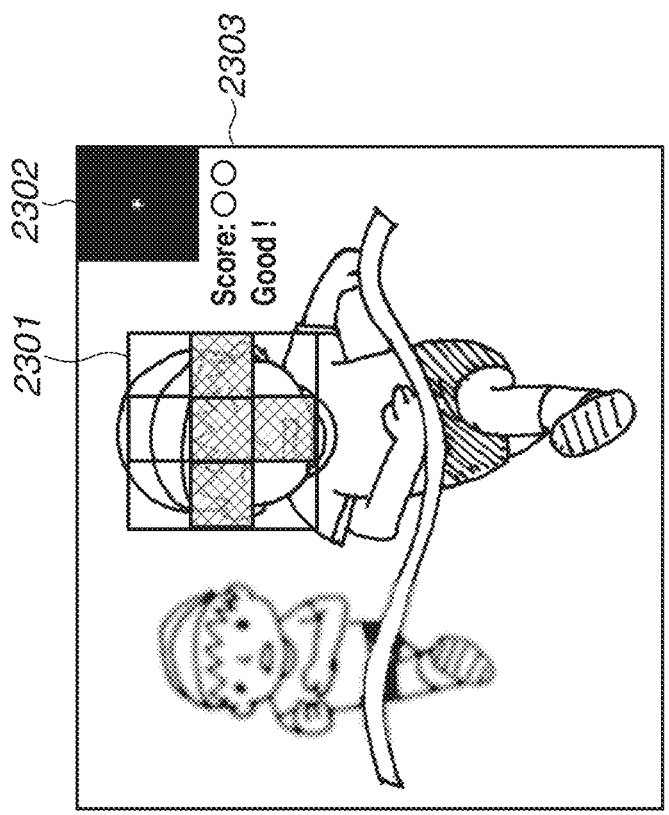
FIG.23A
FIG.23B

APPARATUS FOR ESTIMATING DEFOCUSING OF IMAGE, METHOD THEREOF, AND NON-TRANSITORY COMPUTER-READABLE STORAGE MEDIUM

BACKGROUND

Technical Field

The aspect of the embodiments relates to an image processing apparatus which executes processing for estimating a degree of defocusing of images captured by a digital camera or a smartphone.

Description of the Related Art

Checking a degree of defocusing of an image caused by deviation of a focal point, a camera-shake, or movement of an object is an important element when images captured by a digital camera or a smartphone are evaluated. However, there is an issue that visually checking the degree of defocusing of captured images one by one requires time. Therefore, there has been known a technique which solves the above-described issue by using a technique for estimating a point spread function (PSF) of an image from the image.

For example, according to a technique discussed in Japanese Patent Application Laid-Open No. 2013-192227, an image is divided into a plurality of patches, a PSF common to the patches is estimated based on a PSF estimated from a selected block, and deconvolution of the image is executed.

Further, according to a technique discussed in Japanese Patent Application Laid-Open No. 2009-253936, a PSF is calculated from a plurality of images captured consecutively, and a deterioration amount of each of the images is evaluated after applying different weights to a blurring amount and a defocusing amount. Then, image information having a small deterioration amount is saved.

As described above, although estimating a degree of defocusing of an image is an important element for evaluating the image, the degree of defocusing is not the only evaluation standard by which a user actually selects a favorable image. If composition or facial expression of an object is not desirable, the user gives a low evaluation on the image even if the image is not defocused. Further, if an object intended to be in an image by the user is defocused, the user also gives a low evaluation on the image even if the degree of defocusing of the entire image is small. Further, it is often the case that the user selects an image based on relative evaluation of images instead of absolute evaluation when the user selects an image from among images relating to a particular event.

With the configurations discussed in Japanese Patent Application Laid-Open No. 2013-192227 and Japanese Patent Application Laid-Open No. 2009-253936, although it is possible to generate or record an image that is desirable in terms of a degree of defocusing, the generated or recorded image may not always be the image the user has intended.

SUMMARY

According to an aspect of the embodiments, an apparatus includes at least one memory configured to store instructions, and at least one processor in communication with the at least one memory and configured to execute the instructions to set an estimation area to acquired image data, execute calculation for estimating a degree of defocusing of an image in the estimation area, determine defocusing of the image data based on the estimated degree of defocusing, and display information which allows a user to adjust a threshold for determining defocusing on a display.

According to another aspect of the embodiments, an apparatus includes at least one memory configured to store instructions, and at least one processor in communication with the at least one memory and configured to execute the instructions to detect an object area from acquired image data, set a small estimation area for estimating a degree of defocusing of an image to the object area, display an image based on the image data, the small estimation area being superimposed on the image, on a display, and estimate a degree of defocusing of an image in the small estimation area.

Further features of the disclosure will become apparent from the following description of exemplary embodiments with reference to the attached drawings.

BRIEF DESCRIPTION OF THE DRAWINGS

FIG. 3 is a flowchart illustrating processing relating to determination of defocusing of an image according to a first exemplary embodiment of the disclosure.

FIG. 4 is a flowchart illustrating estimation processing of a point spread function (PSF).

FIGS. 9A and 9B are diagrams illustrating a setting example of a threshold of a PSF score depending on an output size according to the first exemplary embodiment of the disclosure.

FIG. 10 is a diagram illustrating a setting function of a threshold of a PSF score according to the first exemplary embodiment of the disclosure.

FIG. 20 is a flowchart illustrating processing relating to correction of defocusing of an image according to a fifth exemplary embodiment of the disclosure.

FIG. 21 illustrates a state where small areas are changed in conjunction with a change of a defocusing level according to the fifth exemplary embodiment of the disclosure.

FIGS. 23A and 23B are diagrams each illustrating a display image of a live-view moving image according to the sixth exemplary embodiment of the disclosure.

DESCRIPTION OF THE EMBODIMENTS

Hereinafter, exemplary embodiments of the disclosure will be described in detail with reference to the appended drawings.

Figure 1:
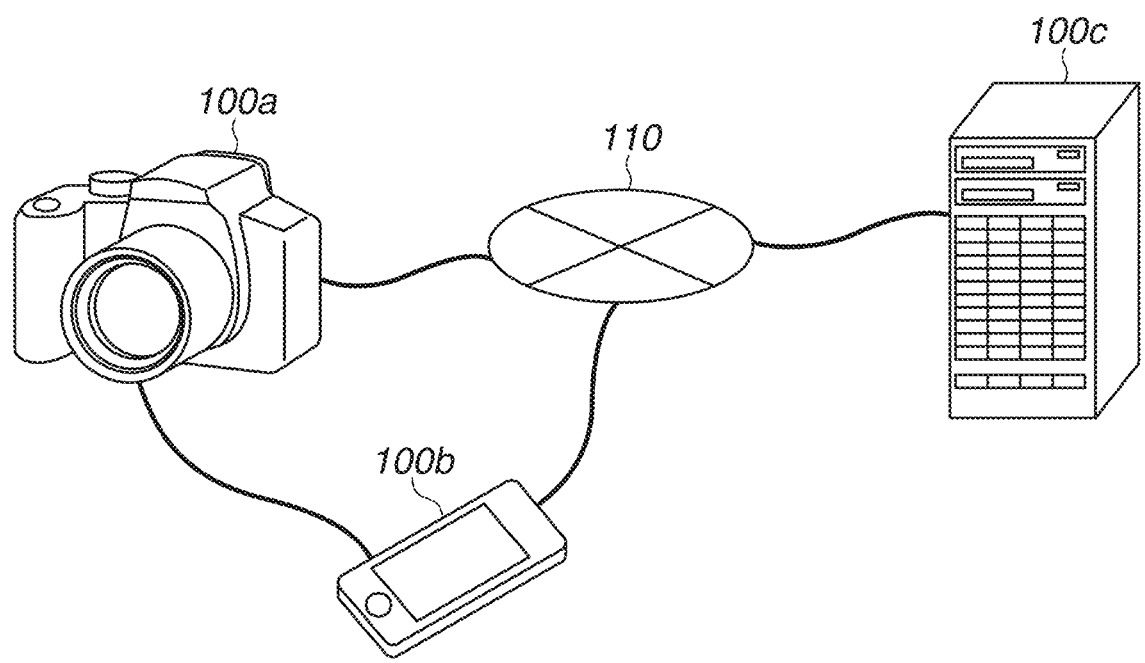
FIG. 1 is a diagram illustrating an image processing apparatus according to an exemplary embodiment of the disclosure.

FIG. 1 is a diagram illustrating an image processing apparatus according to an exemplary embodiment of the disclosure. In FIG. 1, a digital camera 100a, a smartphone 100b, and a server 100c can communicate with each other via a network 110. The digital camera 100a and the smartphone 100b may be connected by a short range communication such as Bluetooth®. The digital camera 100a may be a digital video camera or a monitoring camera.

The smartphone 100b may be a tablet terminal or a personal computer.

The smartphone 100b and the server 100c can receive a still image or a moving image captured by the digital camera 100a by the communication. Further, the smartphone 100b and the server 100c can receive a still image or a moving image existing in the network 110. The aspect of the embodiments can be embodied in an image processing apparatus having a calculation function for evaluating an acquired image, and each of the digital camera 100a, the smartphone 100b, and the server 100c can serve as the image processing apparatus according to the disclosure.

Figure 2:
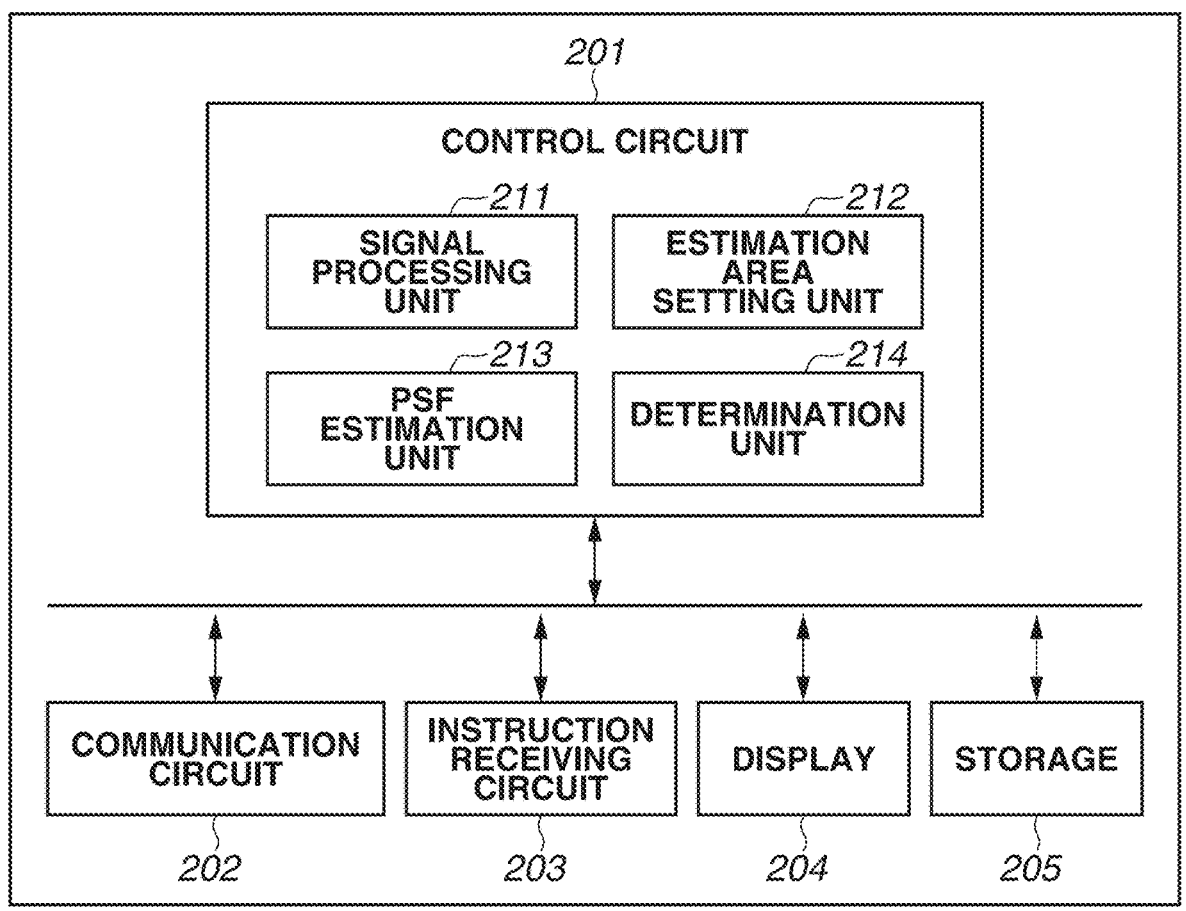
FIG. 2 is a block diagram illustrating a configuration of the image processing apparatus according to the exemplary embodiment of the disclosure.

FIG. 2 is a block diagram illustrating a configuration of an image processing apparatus 100 according to a first exemplary embodiment. The image processing apparatus 100 includes a control circuit 201, a communication circuit 202, an instruction receiving circuit 203, a display 204, and a storage 205.

The control circuit 201 includes a microprocessor and a central processing unit (CPU), and controls the entire operation of the image processing apparatus 100. Further, the control circuit 201 can execute image processing, image correction, and image analysis. The communication circuit 202 receives an image via the network 110, and transmits an image generated by the control circuit 201 to an external apparatus via the network 110. The instruction receiving circuit 203 is a circuit which receives an instruction from a user. When the image processing apparatus 100 includes an operation member such as a button or a dial, the instruction receiving circuit 203 detects an operation performed on the operation member by the user, and transmits an instruction from the user to the control circuit 201. When the display 204 has a touch panel function, the instruction receiving circuit 203 detects a touch operation performed by the user and transmits an instruction from the user to the control circuit 201. When the image processing apparatus 100 has a voice recognition function, the instruction receiving circuit 203 analyzes the user's voice input through a microphone (not illustrated) and transmits an instruction from the user to the control circuit 201. When the image processing apparatus 100 has an eye gaze detection function, the instruction receiving circuit 203 detects the user's eye gaze and transmits an instruction from the user to the control circuit 201. The display 204 displays not only an image but also information indicating a degree of defocusing of an image analyzed by the control circuit 201. Further, the display 204 displays an icon and a menu for receiving an instruction from the user issued to the image processing apparatus 100. The storage 205 is a memory which stores an image acquired via the communication circuit 202 and an image output from the control circuit 201.

The control circuit 201 executes a program stored in an internal memory to function as a signal processing unit 211, an estimation area setting unit 212, a point spread function (PSF) estimation unit 213, and a determination unit 214. In the present exemplary embodiment, the above-described function is realized by software processing. However, all or part of the function may be realized by hardware such as an application specific integrated circuit (ASIC) or a field programmable gate array (FPGA).

The signal processing unit 211 executes noise reduction processing, development processing, and gradation compression processing employing gamma conversion. Further, the signal processing unit 211 executes analysis processing for detecting an object area from image data and evaluating a scene of the image data. Based on a detection result of the object area in the image generated by the signal processing unit 211 or read from the storage 205, the estimation area setting unit 212 determines an estimation area for estimating a PSF in the image data. The PSF estimation unit 213 executes calculation for estimating a PSF of the estimation area set by the estimation area setting unit 212. The determination unit 214 executes determination processing for determining the degree of defocusing of the image based on the PSF estimated by the PSF estimation unit 213.

FIG. 3 is a flowchart illustrating processing relating to determination of defocusing of an image according to the present exemplary embodiment. The processing illustrated in the flowchart in FIG. 3 is executed by the control circuit 201.

In step S301, the image processing apparatus 100 acquires image data. The image processing apparatus 100 may acquire the image data from an external apparatus via the communication circuit 202, or may read image data stored in the storage 205. In a case where the image processing apparatus 100 is an imaging apparatus, the image processing apparatus 100 may execute imaging operation to generate image data. In a case where the acquired image data is in a RAW format, the signal processing unit 211 executes the development processing to convert the image data into image data of a predetermined file format such as a Joint Photographic Experts Group (JPEG) format, an Audio Video Interleaved (AVI) format, or a Moving Picture Experts Group (MP4) format.

Figure 5A:
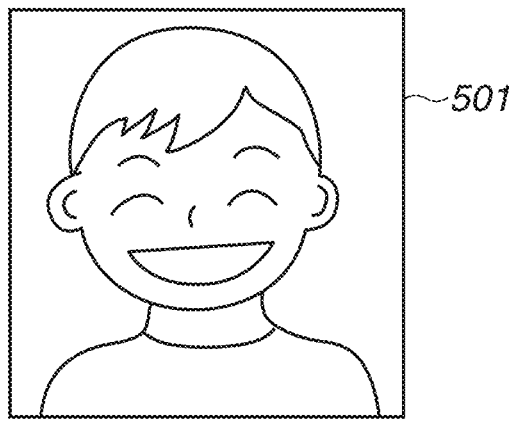
FIGS. 5A and 5B are diagrams illustrating an estimation area of a PSF.
Figure 5B:
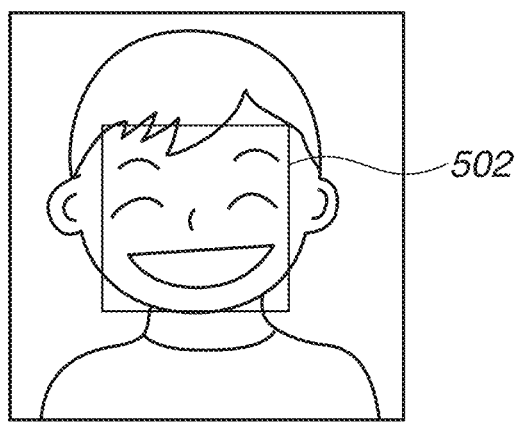

In step S302, an area to be used for determining the degree of defocusing in the image data is determined. In the present exemplary embodiment, the estimation area setting unit 212 sets a rectangular area which surrounds an area determined as a main object in the image data as an estimation area for determining the degree of defocusing. FIGS. 5A and 5B are diagrams illustrating an estimation area 502 of a PSF, illustrating a state where the estimation area 502 is set to image data 501 acquired by the image processing apparatus 100. An area that surrounds a face area is set as the estimation area when the signal processing unit 211 detects the face area as the object area. In a case where a plurality of human faces is included in the image data, a face close to a central position or an auto-focus (AF) position of the image may be selected as the main object, or the main object may be selected by the user. Further, an object detected as the main object does not always have to be a human face, and can be an animal face or a vehicle.

In step S303, the signal processing unit 211 determines whether the estimation area is an area of which the PSF estimation unit 213 can correctly estimate a PSF. The estimation processing will be described below. Because a PSF is estimated with reference to an edge signal, there is a possibility that estimation of the PSF cannot be executed correctly in a case where sufficient edge signals do not exist in the image data of the estimation area. Thus, the signal processing unit 211 detects an edge included in the estimation area and performs integration. Then, if an integrated value is a predetermined value or more (YES in step S303), the signal processing unit 211 determines that a PSF can be estimated, and advances the processing to step S304. If the integrated value is less than the predetermined value (NO in step S303), the signal processing unit 211 determines that a PSF cannot be estimated, and ends the processing.

In step S304, the control circuit 201 displays an image on which a frame surrounding the estimation area 502 is superimposed, on the display 204. The display allows the user to know based on which area in the image the defocusing is determined. In other words, the user can check whether the area where defocusing is determined coincides with an area where the user is interested in.

In step S305, the PSF estimation unit 213 estimates a PSF of the estimation area. In the present exemplary embodiment, a known technique can be employed to execute the estimation processing of a PSF.

Specifically, with respect to the image data acquired by imaging operation, a relationship expressed by the following formula (1) is established, where B represents an image signal of the estimation area, K represents a PSF regarded as an estimation target, and L represents an image (latent image) in the estimation area without defocusing, and noise of the image data acquired by the imaging operation is ignored.

$$B = \mathrm{Conv}(K, L) \quad (1)$$

In the formula (1), Cony represents convolution operation.

In the formula (1), because both K and L are unknown, an appropriate latent image L is estimated. For example, edge enhancement processing is executed on the input image data by applying a shock filter thereto, and estimation image data after the edge enhancement processing is calculated and acquired as the latent image L.

Subsequently, in an energy function E(K) expressed by the following formula (2), L is fixed, and K is specified an unknown. Then, K that minimizes the energy function E(K) is calculated.

$$E(K) = \mathrm{argmin}_K(\|B - \mathrm{Conv}(K, L)\|^2 + \sigma_K^2) \quad (2)$$

In the formula (2), σ represents a regularization term, and an L2 norm which takes a square sum of respective elements of the PSF is used.

Further, in an energy function E(L) expressed by the formula (3), K is fixed, and L is specified as an unknown. Then, L that minimizes the energy function E(L) is calculated by using the calculated K.

$$E(L) = \mathrm{argmin}_L(\|B - \mathrm{Conv}(K, L)\|^2 + \sigma_L^2) \quad (3)$$

In the formula (3), σ represents a regularization term, and an L2 norm which takes a square sum of respective elements of the latent image L is used.

Then, until the calculated K converges to a certain value, K that minimizes the energy function E(K) and L that minimizes the energy function E(L) are repeatedly calculated by respectively using the calculated L and K. K that has converged to a certain value is a PSF.

FIG. 4 is a flowchart illustrating the above-described estimation processing of a PSF.

In step S401, the PSF estimation unit 213 calculates an estimation image of the latent image L.

In step S402, the PSF estimation unit 213 calculates K which minimizes the energy function E(K).

In step S403, the PSF estimation unit 213 determines whether K calculated in step S402 has converged to a certain value. If the number of times of calculation of K has not reached a threshold in step S402, the PSF estimation unit 213 determines that the condition in step S403 is not satisfied (i.e., K has not yet converged to a certain value) (NO in step S403), and the processing proceeds to step S404. In a case where the number of times of calculation of K executed in step S402 has reached the threshold and the PSF estimation unit 213 can determine that K has converged to a certain value by comparing the K with K calculated previously (YES in step S403), the processing of the flowchart ends.

In step S404, the PSF estimation unit 213 calculates L which minimizes the energy function E(L). Then, the processing returns to step S402.

Figure 6:
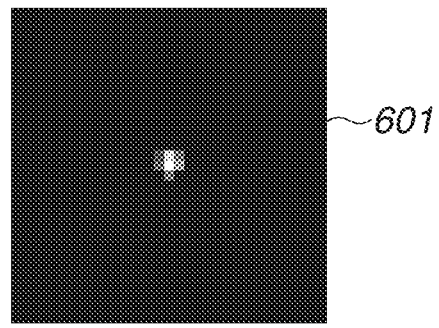
FIG. 6 is a diagram illustrating an estimation result of a PSF.

A general outline of the PSF estimation method according to the present exemplary embodiment has been described as the above. FIG. 6 is a diagram illustrating an estimation result of a PSF. A PSF 601 corresponds to K calculated in step S403.

The description is given with reference to FIG. 3 again. In step S306, the determination unit 214 executes processing for converting K calculated in step S305 into a score. The PSF is reduced when the degree of defocusing of an image is small, and the PSF is spread widely when an image is defocused in a great degree. When blurring occurs in the image, the PSF has characteristics of extending in a direction of the blurring. Therefore, as an indicator of a magnitude of the PSF, an integrated value is acquired by integrating the PSF, and the integrated value is taken as the score. In other words, the score is greater when the degree of defocusing is greater.

The integrated value does not always have to be used as the score, and another method can also be used as a calculation method of the score. For example, in order to focus on how much the PSF has extended, a circumscribed rectangle of an area including a PSF having a non-zero value is calculated, and a length of a long side of the rectangle may be used as a score. Alternatively, a plurality of indicators may be used.

In step S307, the determination unit 214 executes processing for correcting the score calculated in step S306 based on various parameters of development processing. If intensity of noise reduction processing executed in the development processing is increased, an edge signal is deformed so that a level thereof becomes low. If intensity of sharpness processing is increased, the edge signal is enlarged so that a level thereof becomes high. Estimation of the PSF is affected by a level of the edge signal. Therefore, if there is a difference in the level of noise reduction processing or sharpness processing executed on image data, an estimated PSF will be different even if the same scene is captured in the image.

Specifically, the score indicating the PSF is likely to be small when the level of the edge signal is high.

Thus, in order to prevent a difference arising in the score of the PSF, caused by the level of noise reduction processing or sharpness processing, the score is corrected based on a parameter of processing having an influence on intensity of an edge applied to image data of which the PSF is estimated.

Figure 7A:
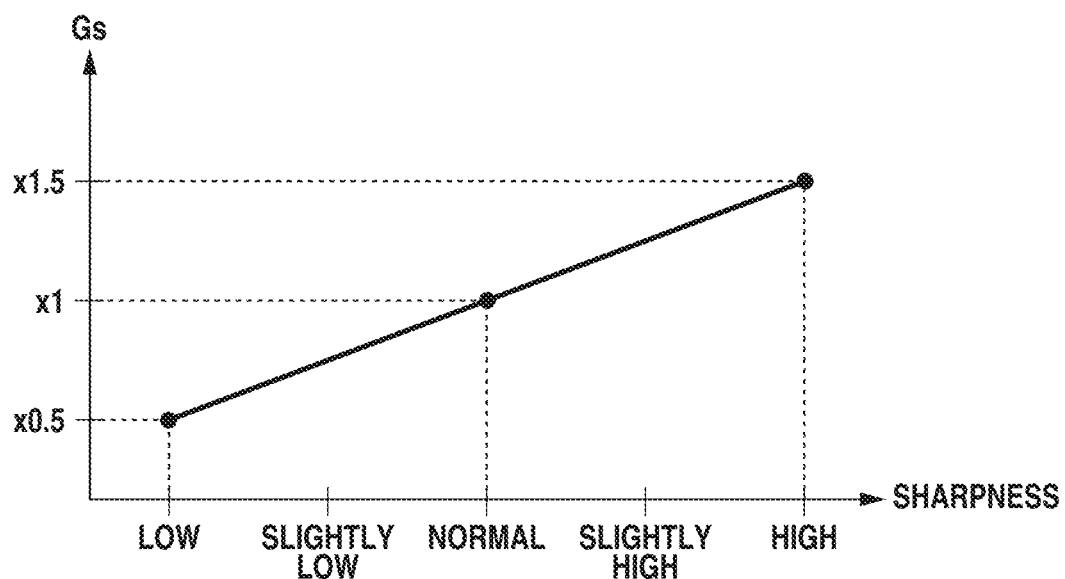
FIGS. 7A and 7B are graphs illustrating a calculation method of score gain Gs according to the first exemplary embodiment of the disclosure.
Figure 7B:
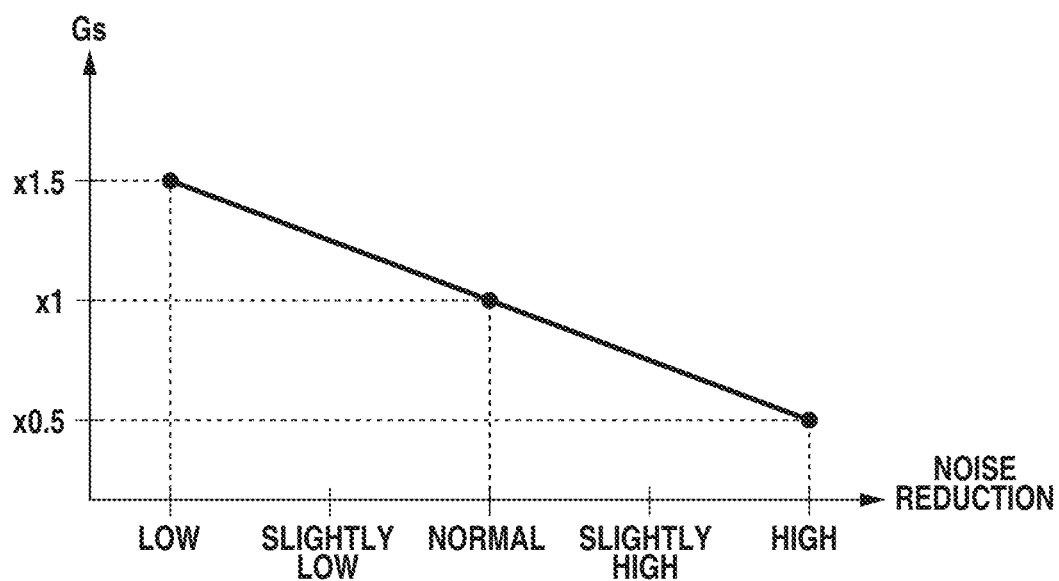

FIGS. 7A and 7B are graphs illustrating a setting method of a gain Gs by which the score acquired in step S306 is multiplied. As illustrated in FIGS. 7A and 7B, a greater gain Gs is set as the level of sharpness processing is higher, and a smaller gain Gs is set as the level of sharpness processing is lower. In contrast, a smaller gain Gs is set as the level of noise reduction processing is higher, and a greater gain Gs is set as the level of noise reduction processing is lower. In other words, in a case where the processing which increases the level of the edge is executed, a score indicating the degree of defocusing is likely to be reduced. Thus, the determination unit 214 corrects the score to cause presence of defocusing to be easily determined. On the other hand, in a case where the processing which reduces the level of the edge is executed, the score indicating the degree of defocusing is likely to be increased. Thus, the determination unit 214 corrects the score to cause the presence of defocusing to be hardly determined.

A correction method of the score is not limited to the above, and the score may be corrected with reference to another parameter such as intensity of contrast. Alternatively, the score may be corrected depending on resolution of image data. For example, defocusing is noticeable when resolution is high. Therefore, presence of defocusing can be determined more easily by correcting and increasing the score.

The same effect can also be acquired by correcting a threshold calculated in subsequent step S308 instead of correcting the score. Because the threshold is used for making a comparison with the score, a relationship of a magnitude of gain to the threshold is opposite to a relationship of a magnitude of gain to the score. In other words, the gain is set in such a way that the threshold is smaller as the level of sharpness processing is higher or the level of noise reduction processing is lower. The processing in step S307 is not essentially required and can be omitted.

Figure 8:
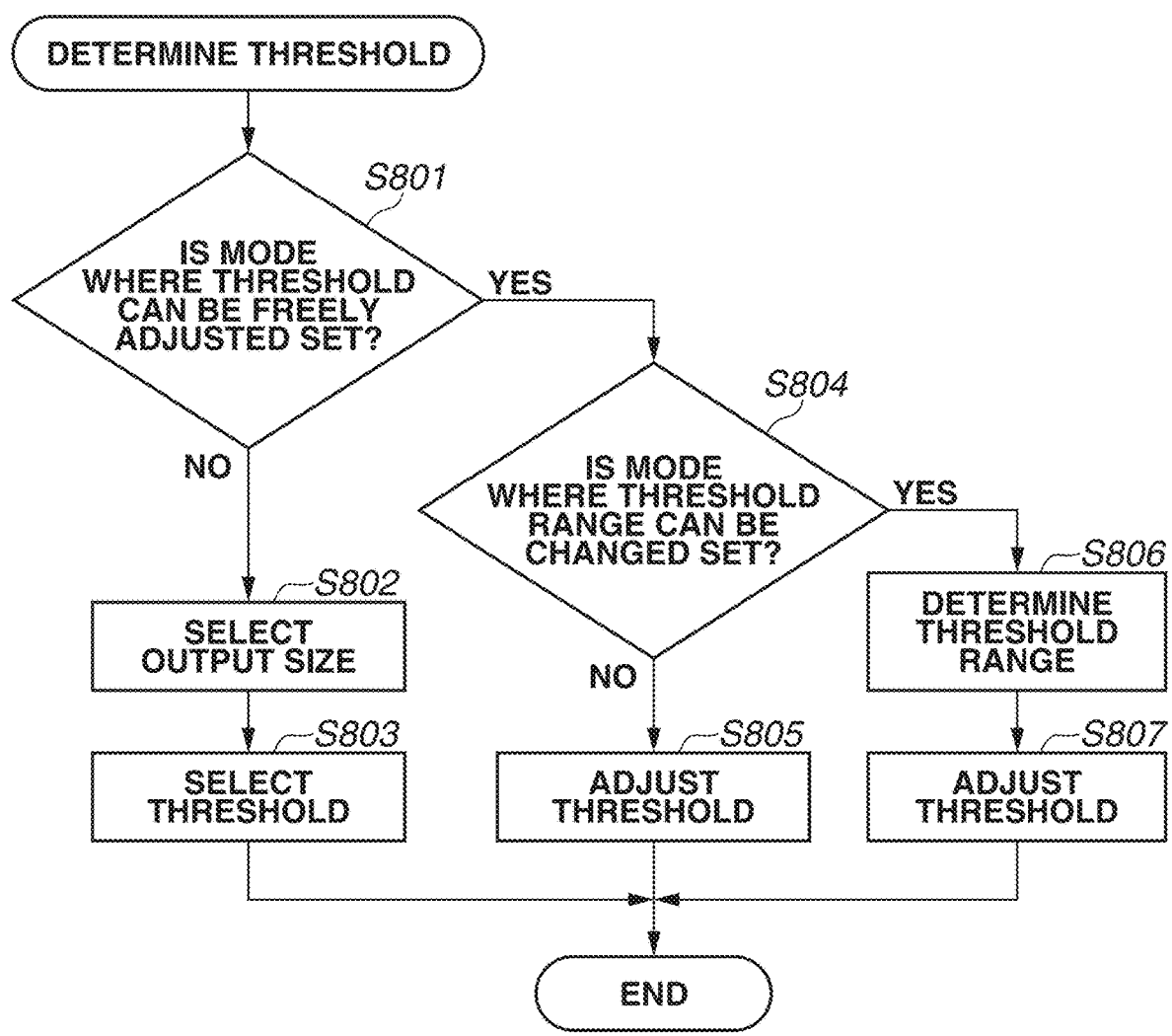
FIG. 8 is a flowchart illustrating adjustment processing of a threshold with respect to a PSF score according to the first exemplary embodiment of the disclosure.

In step S308, processing for determining a threshold to be compared with the score corrected in step S307 is executed. FIG. 8 is a flowchart illustrating processing for adjusting a threshold of the score of the PSF according to the present exemplary embodiment.

In step S801, the determination unit 214 determines whether a mode which allows the user to freely adjust a threshold is set. If the mode which allows the user to freely adjust a threshold is set (YES in step S801), the processing proceeds to step S804. If the mode is not set (NO in step S801), the processing proceeds to step S802. The mode which allows the user to freely adjust a threshold may be selected in advance by the user from a menu screen. Alternatively, in step S308, an icon for starting the mode which allows the user to freely adjust a threshold may be displayed on the display 204, so that the user can set that mode by selecting the icon.

In step S802, the determination unit 214 allows the user to select an output size in place of resolution of the image. FIGS. 9A and 9B are diagrams illustrating a setting example of the threshold of the PSF score depending on the output size, according to the present exemplary embodiment. FIG. 9A is a diagram illustrating a screen displayed on the display 204, which allows the user to select the output size. The user selects the output size such as an A1 poster size or an A6 postcard size depending on the purpose of use.

In step S803, the determination unit 214 determines the threshold depending on the output size selected by the user in step S802. FIG. 9B is a diagram illustrating the threshold determined in advance for each resolution. When the resolution of the image is low, defocusing of the image is less noticeable. Therefore, a greater threshold is set as the resolution of the image is lower, so that the presence of defocusing is hardly determined. In a case where the user selects in advance the output size corresponding to the resolution of a predetermined level or lower (e.g., an A5 handout size or smaller), estimation processing of the PSF may be executed after a size of the image data acquired in step S301 is reduced. This is because a determination result of defocusing is less influenced even if the resolution of the image data used for estimating the PSF is lowered when the resolution of the output image data is low. Therefore, a processing load can be reduced by reducing a size of the image data.

In step S804, the determination unit 214 determines whether a mode for changing an adjustment range of a slider bar for adjusting a threshold is set. The slider bar enables the adjustment range of the threshold to be changed depending on a plurality of images simultaneously displayed on the display 204. The mode for changing the adjustment range of the slider bar may be selected in advance by the user from a menu screen, or may be set automatically when a plurality of images is simultaneously displayed on the display 204. If the mode for changing the adjustment range of the slider bar is set (YES in step S804), the processing proceeds to step S806. If the mode is not set (NO in step S804), the processing proceeds to step S805.

In step S805, the determination unit 214 changes the threshold for determining defocusing according to an operation of the slider bar displayed on the display 204, performed by the user. FIG. 10 is a diagram illustrating a setting function of the threshold of the score of the PSF according to the present exemplary embodiment. As illustrated in FIG. 10, the slider bar is displayed on a lower side of an image 1001, on which a frame surrounding the estimation area is displayed, on the display 204. The slider bar expresses a magnitude of the threshold for determining defocusing. The user can change the magnitude of the threshold by performing a touch operation. The magnitude of the threshold may also be changed by an operation performed on a cursor or a dial instead of the touch operation. In step S805, a minimum value and a maximum value of the threshold expressed by the slider bar is not changed even if the image displayed on the display 204 is changed.

In the example illustrated in FIG. 10, the threshold is increased as the user moves the finger to the right, so that presence of defocusing in the image is hardly determined (i.e., absence of defocusing is determined easily). As described above, since the presence or absence of defocusing can be determined based on a standard the user desires instead of an absolute standard, evaluation of the image can be executed as intended by the user.

Figure 11A:
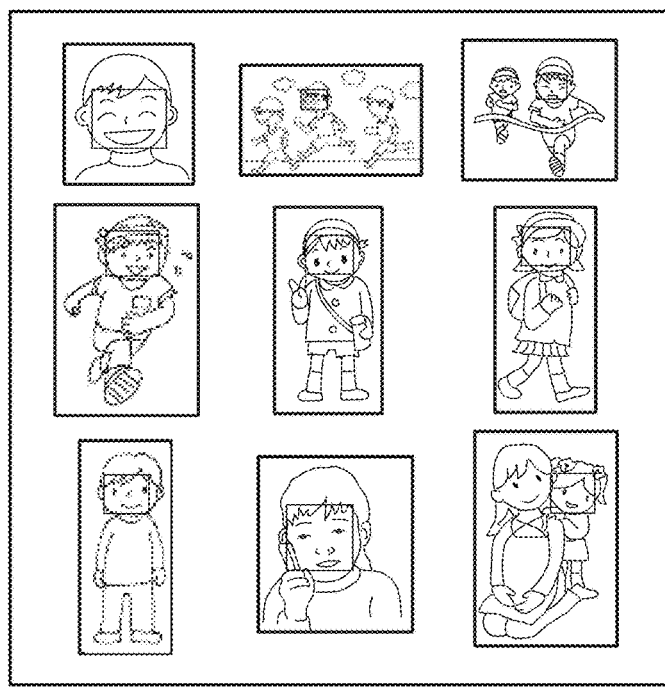
FIGS. 11A and 11B are diagrams illustrating a setting function of a threshold of a PSF score with respect to a plurality of images according to the first exemplary embodiment of the disclosure.
Figure 11B:

In step S806, based on scores of a plurality of images simultaneously displayed on the display 204, processing for changing at least one of the maximum value and the minimum value of the threshold expressed by the slider bar displayed on the display 204 is executed. FIGS. 11A and 11B are diagrams illustrating a setting function of thresholds of PSF scores with respect to a plurality of images according to the present exemplary embodiment. In FIG. 11A, nine images 1101 are simultaneously displayed on the display 204, and a range of thresholds expressed by the slider bar displayed on the lower side of the images 1101 is changed based on the PSF scores acquired from nine pieces of image data as sources of the nine images 1101.

Figure 12:
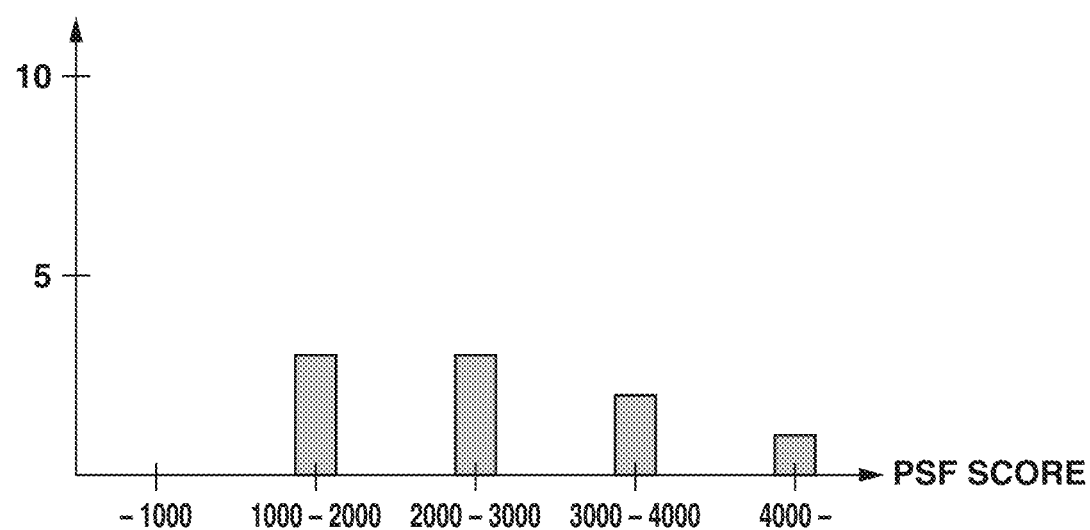
FIG. 12 is a graph illustrating an example of a distribution of PSF scores according to an exemplary embodiment of the disclosure.

From among the scores acquired for the nine pieces of image data as the sources of the nine images 1101 simultaneously displayed on the display 204, the determination unit 214 extracts scores each having a predetermined value or less. FIG. 12 is a graph illustrating an example of a distribution of the PSF scores, which indicates that an image is defocused in a greater degree as a score thereof is greater. A maximum value and a minimum value are extracted from among scores which exclude a score having a predetermined value or more (e.g., 4000 or greater). Then, the scores ranging from the minimum value to the maximum value are set as scores in a range of thresholds adjustable by the slider bar, and displayed on the display 204.

Herein, a reason for changing the adjustment range of the thresholds will be described. When the range of thresholds adjustable by the slider bar is fixed, a range of thresholds ranging from the minimum value to the maximum value adjustable by the slider bar has to be widened to thoroughly cover the range of scores of the images displayed simultaneously. In this case, if the scores of the images simultaneously displayed on the display 204 are close to each other, a range of thresholds for causing a difference in determination results of the presence or absence of defocusing of the plurality of images is narrowed and limited considerably. Performing a touch operation, for example, to specify a threshold from such a limited range is difficult for the user.

Thus, in the present exemplary embodiment, since the threshold expressed by the slider bar can be changed to be in a range and granularity suitable for the distribution of the scores of the plurality of images displayed simultaneously, it is possible to easily differentiate between determination results of the presence or absence of defocusing of the images. In the present exemplary embodiment, a score having a predetermined value or more is excluded. This is because an upper limit value of the adjustment range becomes too large and adjustment granularity will be coarse if an image defocused in a great degree and having an extremely great PSF score is included in the plurality of images. Further, because the user can easily recognize defocusing when the image is obviously defocused, excluding the score of that image from the adjustment range of thresholds of the slider bar is thought to be not much of a problem.

In the present exemplary embodiment, the maximum value and the minimum value of the scores is used for setting the adjustment range, but another method is also applicable to the aspect of the embodiments. For example, a predetermined range having a median value of the scores at the center (e.g., a median value±2000) may be specified as the adjustment range. Alternatively, an average value N and a variance value σ of the scores are calculated, and a range expressed by N±σ may be specified as the adjustment range.

In step S807, the determination unit 214 changes the threshold for determining defocusing based on an operation on the slider bar displayed on the display 204 performed by the user. At this time, a range of thresholds determined in step S806 is used as the range of thresholds adjustable by the slider bar.

The description is given with reference to FIG. 3 again. In step S309, the determination unit 214 compares the score corrected in step S307 with the threshold set in step S308. If the score of the image is the threshold value or more, the determination unit 214 determines the presence of defocusing. If the score of the image is less than the threshold, the determination unit 214 determines the absence of defocusing. As illustrated in FIG. 11B, from among nine images 1102, an image where the absence of defocusing is determined is surrounded by a colored frame. In this way, the user can easily grasp in which image the absence of defocusing is determined. In a case where the user operates the slider bar, the processing may return to step S308 even if the processing has already proceeded to step S309. With this configuration, the user can confirm a change of a determination result made by the determination unit 214 while operating the slider bar, so that the user can easily compare a relative difference in the degree of defocusing between the images. In addition, a color or a thickness of the frame may be changed depending on the degree of defocusing when the colored frame is applied to the image. Further, the colored frame is one example of a method for expressing the degree of defocusing to the user, and a score proportionate to the degree of defocusing or an icon expressing the degree of defocusing may be displayed thereon.

As described above, since the threshold for determining defocusing of an image can be operated by the user, the user can easily grasp superiority or inferiority with respect to the degree of defocusing between images the user is interested in. Therefore, the user can easily perform relative evaluation of images, so that an image suitable for the user's purpose can be selected easily.

In the present exemplary embodiment, the adjustment range of the slider bar is determined in step S308 based on the scores of PSFs of the images simultaneously displayed on the display 204. However, the configuration is not limited thereto, and the adjustment range may be determined based on scores of another group of images. For example, the adjustment range of the slider bar may be determined based on scores of PSFs of a series of images captured consecutively. There is a case where all of the images cannot be displayed simultaneously if a large number of images are captured consecutively. At this time, if the adjustment range of the slider bar is changed every time the images displayed on the display 204 are changed, it is difficult to determine defocusing of the series of consecutively captured images based on the same standard. In contrast, if the adjustment range of the slider bar is set based on all of the PSF scores of the series of images captured consecutively, the degree of defocusing can easily be determined based on the same standard as long as any of the series of images are displayed thereon. While the present exemplary embodiment is described by making a group of images captured consecutively as a target, the series of images may be determined based on a date and time, or may be determined based on a storage area such as a folder where the images are saved.

Further, in the present exemplary embodiment, estimation of the PSF and determination of defocusing are executed by the image processing apparatus 100. However, part of the processing may be executed by an external apparatus. For example, the image processing apparatus 100 may transmit the image data to an external apparatus so that the external apparatus determines an estimation area and estimates a PSF, and may transmit results of the determination and estimation to the image processing apparatus 100. Alternatively, the estimation of the PSF may be executed by the external apparatus.

In the present exemplary embodiment, defocusing is determined by comparing the score of the PSF with the threshold. However, an alternative method is to determine a recommended output size for outputting an image. For example, an output size smaller than or equal to an A4 size may be recommended when the PSF score is 2000. By indicating an upper limit of the output size in which defocusing is less noticeable, the user can easily select an image depending on the purpose of use.

Further, in the configuration described in the present exemplary embodiment, determination of defocusing is not executed when not many edge signals exist in the estimation area surrounded by a specification frame. However, determination may be executed with reference to another information.

For example, the control circuit 201 may determine whether to execute determination of defocusing based on the contrast acquired when imaging operation is executed, various auto-focus evaluation values such as a phase difference of a plurality of optical images, or a signal output from a gyroscope.

Further, in the present exemplary embodiment, when the slider bar is moved to the right, the absence of defocusing is determined even if the degree of defocusing is great. However, the present exemplary embodiment is not limited to such a configuration. If the slider bar expresses a degree of strictness of determination of defocusing, the absence of defocusing is hardly determined unless the degree of defocusing is fairly small when the slider bar is moved to the right. Further, the slider bar is merely one example, and as long as the user can visually recognize the adjustment of the threshold, a dial or a counter may also be used instead of the slider bar.

Next, a second exemplary embodiment will be described. A purpose of the present exemplary embodiment is to allow a user to select an image of a desirable frame where defocusing is suppressed, from a moving image or a group of still images captured consecutively.

Figure 13:
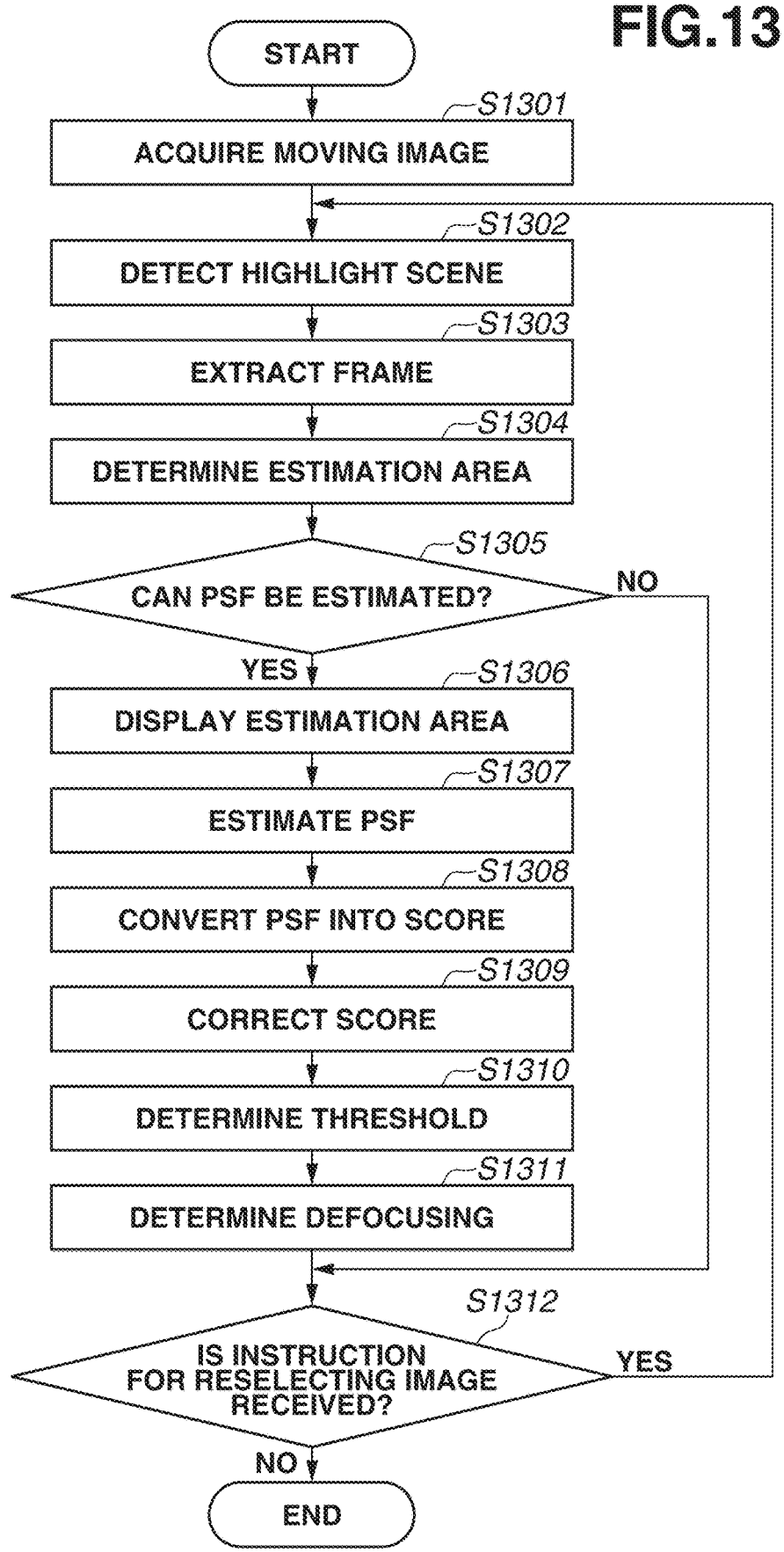
FIG. 13 is a flowchart illustrating processing relating to determination of defocusing of an image according to a second exemplary embodiment of the disclosure.

FIG. 13 is a flowchart illustrating processing relating to determination of defocusing of an image according to the present exemplary embodiment. The processing different from the processing according to the first exemplary embodiment is mainly described.

In step S1301, the image processing apparatus 100 acquires a moving image or a group of still images captured consecutively. Herein, the exemplary embodiment will be described by taking the moving image as an example.

In step S1302, the signal processing unit 211 detects a section regarded as a highlight scene from the acquired moving image. A known method can be used as a detection method of the highlight scene. For example, a method discussed in Japanese Patent Application Laid-Open No. 2010-28773 may be used. In this method, a smiling face of a human is recognized, and a section regarded as the highlight scene is detected based on an evaluation given to the smiling face. Alternatively, a method using a moving amount of an object, a change of a scene, or audio information may be used. Alternatively, a partial section may be selected at random.

Figure 14:
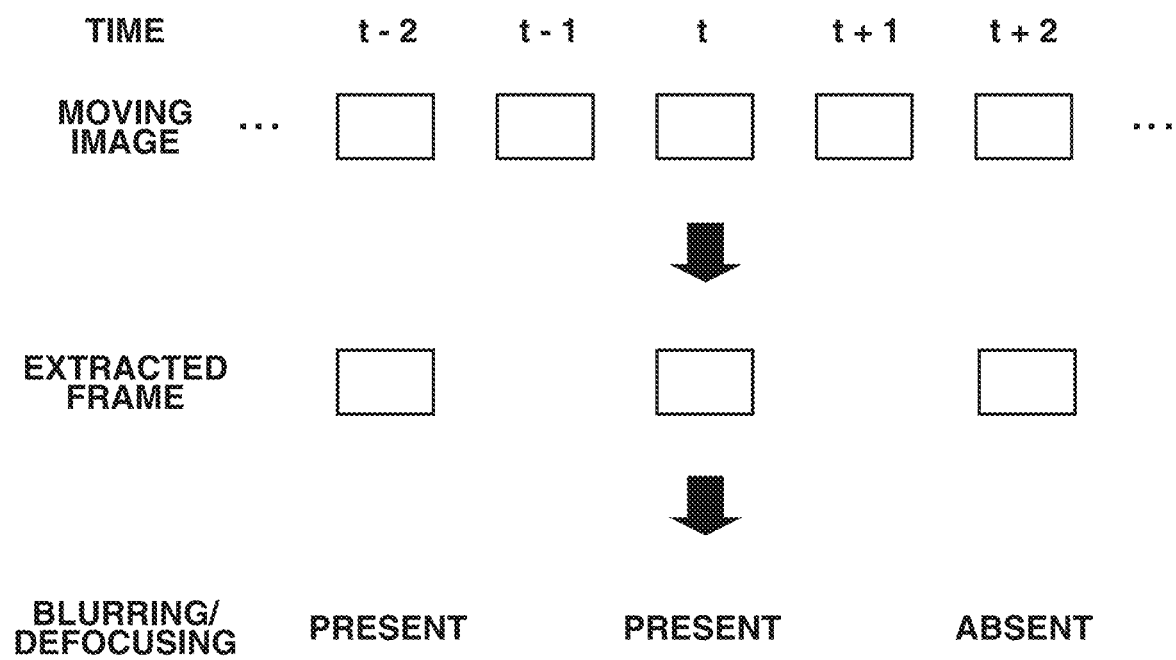
FIG. 14 is a diagram illustrating processing for extracting a frame image from a moving image.

FIG. 14 is a diagram illustrating processing for extracting a frame image from a moving image. In FIG. 14, frames in a section of times t−2 to t+2 are detected as the highlight scene.

In step S1303, the signal processing unit 211 generates still images from the frames of the moving image in the section detected in step S1302. In FIG. 14, from among five frames in the section of times t−2 to t+2, still images are generated from three frames at times t−2, t, and t+2. Herein, a frame rate of the still images generated from the moving image frames is thinned out in order to reduce a processing load. The processing in step S1303 may be omitted.

The processing in steps S1304 to S1311 is similar to the processing in steps S302 to S309 in FIG. 3. In FIG. 14, a determination result of defocusing is illustrated with respect to each of the still images generated from the frames at times t−2, t, and t+2. The presence of defocusing is determined with respect to the still images at the times t−2 and t, and the absence of defocusing is determined with respect to the still image at the time t+2.

In step S1312, the control circuit 201 displays a screen which allows the user to input an instruction for reselecting an image for generating a still image on the display 204. If the instruction for reselecting an image is received from the user (YES in step S1312), the processing returns to step S1302. If the processing returns to step S1302, a new highlight scene is detected from a range excluding frames in sections previously selected as highlight scenes. If the instruction for reselecting an image is not received from the user (NO in step S1312), the processing is ended.

Even if the user tries to select a desired image based on the determination result of defocusing acquired in step S1311, an image which the user desires may not be included in images that are determination targets. In this case, in the present exemplary embodiment, determination of defocusing is executed again after a section to be extracted as the highlight scene is changed. In this way, it is possible to allow the user to easily select a desired image without placing a large burden on the user.

Next, a third exemplary embodiment will be described. A purpose of the present exemplary embodiment is to improve a sense of satisfaction of the user with respect to determination of defocusing by allowing the user to specify an area in which determination of defocusing is to be executed.

Figure 15:
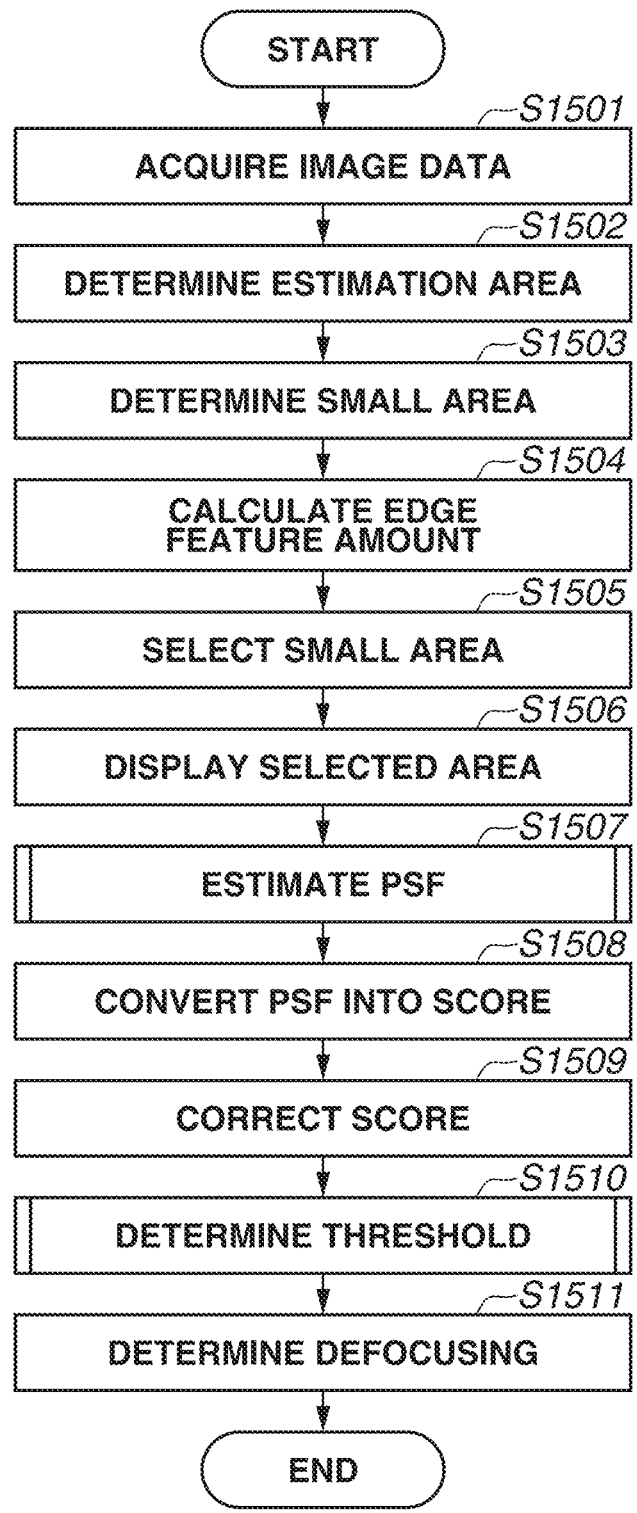
FIG. 15 is a flowchart illustrating processing relating to determination of defocusing of an image according to a third exemplary embodiment of the disclosure.

FIG. 15 is a flowchart illustrating processing relating to determination of defocusing of an image according to the present exemplary embodiment. The processing different from the processing according to the first exemplary embodiment is mainly described.

In step S1501, the image processing apparatus 100 acquires image data.

In step S1502, the estimation area setting unit 212 sets a rectangle area that surrounds an area determined as a main object as an estimation area in the image data.

In step S1503, the estimation area setting unit 212 sets a plurality of small areas in the estimation area set in step S1502. In the present exemplary embodiment, the plurality of small areas is set by dividing the estimation area into a predetermined number of areas. Herein, the estimation area is divided into sixteen areas. However, a setting method of the small areas is not limited thereto. For example, the small areas may be set in such a manner that the small areas overlap with each other at edge portions thereof or that a gap is arranged between the small areas. The number of small areas is not limited to sixteen, and the number of small areas may be changed depending on a size of the estimation area.

In step S1504, the signal processing unit 211 calculates an edge feature amount e_value for each of the small areas. The edge feature amount e_value is acquired by evaluating intensity of an edge and deviation of an edge direction. First, the intensity of an edge is calculated by a known method.

For example, as expressed by the formula 4, with respect to an image of a small area, a high-pass filter is applied in the horizontal direction and the vertical direction. A square root of sum of squares of a value Ih of each pixel acquired by applying the high-pass filter in the horizontal direction and a value Iv of each pixel acquired by applying the high-pass filter in the vertical direction is taken as an edge intensity III of each pixel.

$$|Il|=\sqrt{Ih^2+Iv^2} \qquad (4)$$

Next, the deviation of the edge direction in the small area is evaluated by using an edge having edge intensity greater than a predetermined value. As expressed by the formula (5), for example, an edge direction θ is acquired by using the above-described values Ih and Iv.

$$\theta = \tan^{-1}\left(\frac{Iv}{Ih}\right) \qquad (5)$$

Figure 16A:
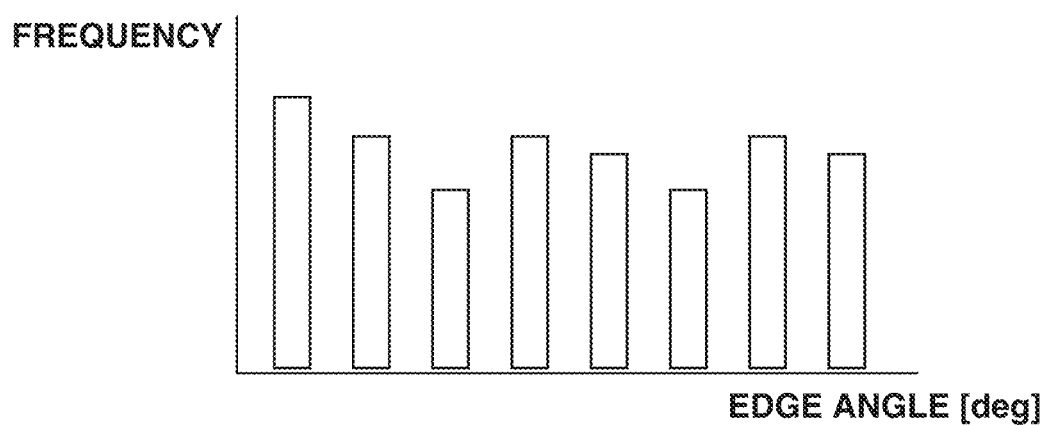
FIGS. 16A and 16B are diagrams illustrating histograms used for calculating an edge feature amount.
Figure 16B:
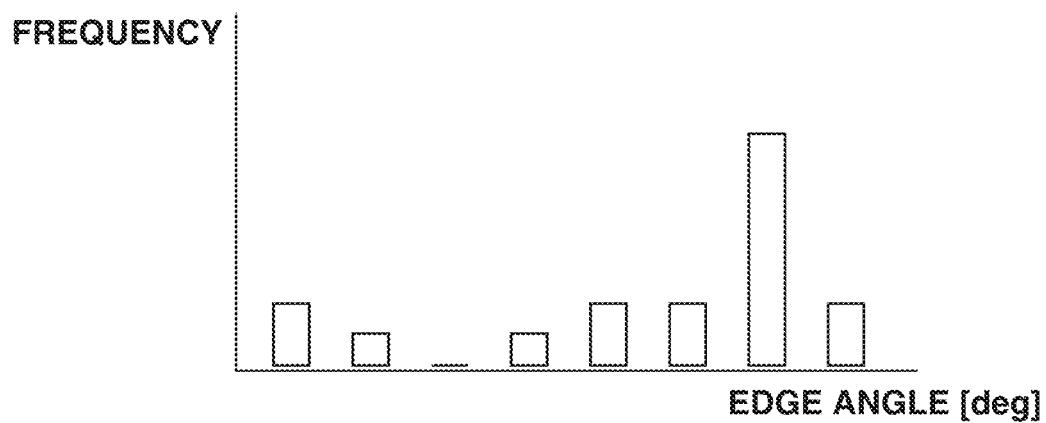

FIGS. 16A and 16B are histograms used for calculating an edge feature amount. In both of FIGS. 16A and 16B, a horizontal axis represents an edge angle sectioned by predetermined resolution, and a vertical axis represents an observation frequency of an edge (i.e., the number of edges) having edge intensity greater than a predetermined value.

If variation in height of the histogram is small as illustrated in FIG. 16A, it indicates that deviation in the edge direction within the small area is small. If the variation in height of the histogram is large as illustrated in FIG. 16B, it indicates that deviation exists in the edge direction within the small area. Therefore, the PSF estimation unit 213 uses a variance value of the observation frequency as the edge feature amount e_value.

In step S1505, the signal processing unit 211 selects a small area whose edge feature amount e_value acquired in step S1504 is greater than a predetermined value as a small estimation area for estimating a PSF.

Figure 17A:
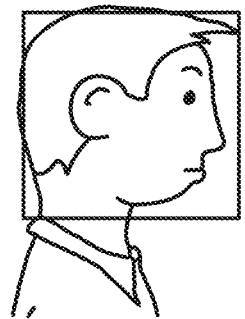
FIGS. 17A and 17B are diagrams illustrating a small area for estimating a PSF according to the third exemplary embodiment of the disclosure.
Figure 17B:
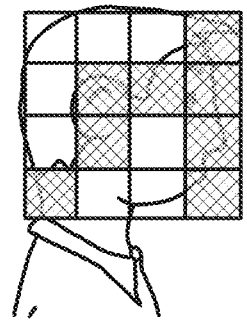

In step S1506, the control circuit 201 displays an image, on which a frame indicating the small estimation area is superimposed, on the display 204. FIGS. 17A and 17B are diagrams illustrating a display state of a small estimation area of a PSF according to the present exemplary embodiment. FIG. 17A illustrates a state where the estimation area set in step S1502 is superimposed on image data. FIG. 17B illustrates a state where the small estimation area selected in step S1505 is displayed in a state different from a display state of the other small areas of the estimation area. For example, the small estimation area can be differentiated from the other small areas by thickening or coloring the contour of the small estimation area, or by coloring the small estimation area with a translucent chromatic color. Alternatively, the small estimation area may be superimposed and displayed on the image. In this way, the user can understand more specifically based on which area in the image defocusing is to be determined.

In step S1507, the PSF estimation unit 213 estimates a PSF common to two or more small estimation areas selected in step S1505. The PSF estimation unit 213 executes estimation processing of a PSF for each of the small estimation areas by a method described in step S305, and acquires an average of PSFs estimated from the small estimation areas. Further, in a case where N pieces of small estimation areas are selected, the PSF may be estimated by acquiring K common to the N pieces of small estimation areas as expressed by the formula (6).

$$E(K)=\operatorname{argmin}_K(\Sigma_{i=1}^N(\|B_i-\operatorname{Conv}(K, L_i)\|^2+\sigma_k^2)) \qquad (6)$$

The processing in steps S1508 to S1511 is similar to the processing in steps S306 to S309 in FIG. 3.

In addition, the PSF acquired in step S1507 may be recorded in the storage 205 together with the image data, so that the recorded PSF can be read when the image is checked again.

As described above, estimation is executed after a plurality of small estimation areas appropriate for the estimation is selected, and the selected small estimation areas are displayed to the user. In this way, it is possible to improve the sense of satisfaction of the user with respect to evaluation of defocusing.

Next, a fourth exemplary embodiment will be described. In the present exemplary embodiment, deconvolution processing for resolving defocusing is executed based on a PSF estimated from a small estimation area. The small estimation area may be selected automatically, or may be freely selected by the user.

Figure 18:
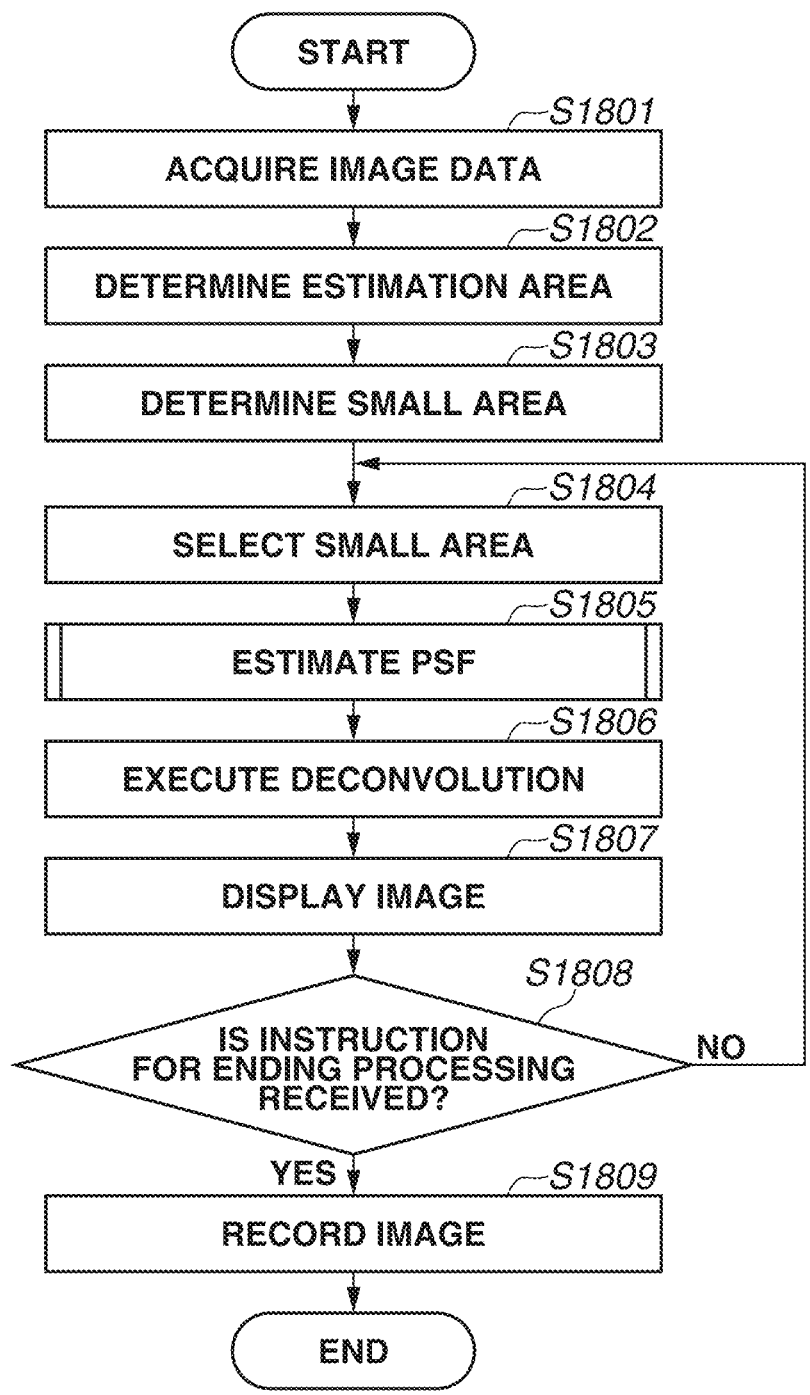
FIG. 18 is a flowchart illustrating processing relating to correction of defocusing of an image according to a fourth exemplary embodiment of the disclosure.

FIG. 18 is a flowchart illustrating processing relating to correction of defocusing of an image according to the present exemplary embodiment. The processing different from the processing according to the third exemplary embodiment is mainly described. In the present exemplary embodiment, a specification which allows a user to freely select a small area is taken as an example.

The processing in steps S1801 to S1803 is similar to the processing in steps S1501 to S1503.

In step S1804, the control circuit 201 displays an image on which the small estimation area determined in step S1803 is superimposed, on the display 204, and allows the user to select one or more small areas. Then, the control circuit 201 sets the one or more small areas selected by the user as small estimation areas. The control circuit 201 displays the set small estimation areas on the display 204.

In step S1805, by a method similar to the method employed in step S1507, the PSF estimation unit 213 estimates a PSF common to the plurality of small estimation areas selected by the user in step S1804.

In step S1806, based on the PSF estimated in step S1805, the signal processing unit 211 executes recovery processing for correcting defocusing by executing deconvolution processing on the image data.

A general outline of the recovery processing will be described. The following formula (7) is satisfied where a captured image (deteriorated image) is g(x, y), an original image is f(x, y), and a point spread function PSF, i.e., a Fourier pair of an optical transfer function OTF, is h(x, y).

$$g(x, y)=h(x, y)*f(x, y) \qquad (7)$$

In the formula, a symbol * represents convolution (convolution integration, sum of products), and coordinates (x, y) represent coordinates on the captured image.

Further, the formula (8) expressed by a product of each frequency can be acquired when the formula (7) is converted into a representation on a frequency plane by the Fourier transformation.

$$G(u, v)=H(u, v)\cdot F(u, v) \qquad (8)$$

In the formula, H represents an optical transfer function OTF acquired by the Fourier transformation of a point spread function PSF(h), and G and F respectively represent functions acquired by the Fourier transformation of a degraded image g and an original image f. Coordinates (u, v) represents coordinates on a two-dimensional frequency plane, i.e., a frequency.

In order to acquire the original image f from the captured degraded image g, both sides may be divided by an optical transfer function H as expressed by the following formula (9).

$$G(u, v)/H(u, v)=F(u, v) \quad (9)$$

Then, F(u, v), i.e., G(u, v)/H(u, v), is returned to an actual plane by the inverse Fourier transformation, so that an original image f(x, y) can be acquired as a recovered image.

Where R is the inverse Fourier transformation of 1/H, as expressed by the following formula (10), the original image f(x, y) is similarly acquired by executing convolution processing on the image on the actual plane.

$$g(x, y)*R(x, y)=f(x, y) \quad (10)$$

In step S1807, the control circuit 201 displays an image on the display 204 by using the image data acquired by executing deconvolution processing.

In step S1808, the control circuit 201 displays an inquiry about whether the user wants to reselect a small area or to end the processing. If an instruction for reselecting a small area without ending the processing is received from the user (NO in step S1808), the processing returns to step S1804. In other words, in a case where a result of the deconvolution processing executed based on a PSF in the small area selected in step S1804 is not satisfactory, the user can reselect a small area and re-execute the deconvolution processing based on another PSF.

In step S1808, if an instruction for ending the processing is received from the user (YES in step S1808), the processing proceeds to step S1809. In step S1809, the control circuit 201 records the image data on which the deconvolution processing has been executed in the storage 205.

Figure 19A:
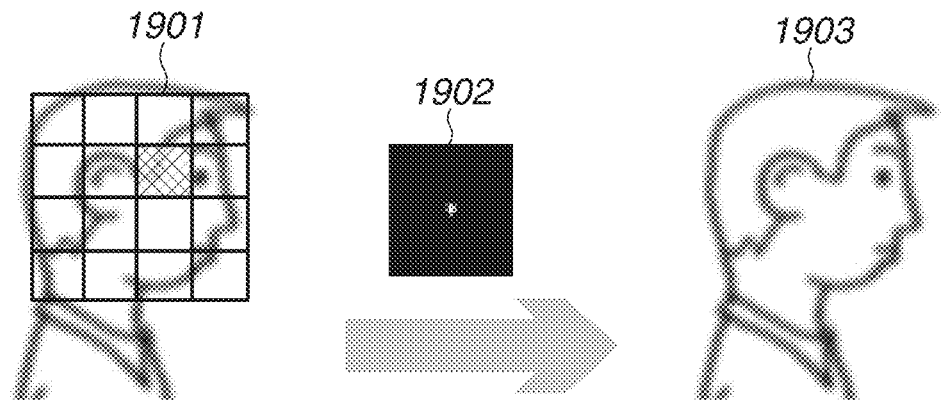
FIGS. 19A and 19B each illustrate an estimation result of a PSF with respect to a selected small area or selected small areas, and a result of deconvolution.
Figure 19B:
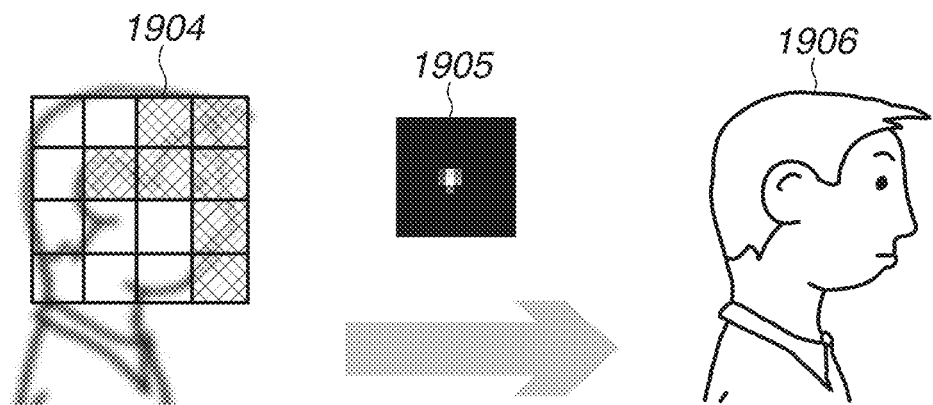

Each of FIGS. 19A and 19B illustrates small areas selected by the user, an estimation result of a PSF acquired from the selected small areas, and a state of an image on which the deconvolution processing has been executed based on the estimation result of the PSF.

FIG. 19A illustrates a state where one small area is selected by the user. FIG. 19B illustrates a state where a plurality of small areas is selected because the user is not satisfied with a result of the deconvolution processing illustrated in FIG. 19A. There is a case where estimation of a PSF for precisely correcting defocusing of the image is difficult when an amount of edge information acquired from the small area specified by the user is small. In the present exemplary embodiment, the user can specify a small area where defocusing should be resolved intensively while checking a result of the deconvolution processing. Therefore, it is possible to correct defocusing as intended by the user.

Next, a fifth exemplary embodiment will be described. The present exemplary embodiment is directed to allowing a user to intuitively grasp a relationship between a degree of defocusing and a small area by displaying a degree of defocusing and a small area corresponding to the degree of defocusing.

FIG. 20 is a flowchart illustrating processing relating to correction of defocusing of an image according to the present exemplary embodiment. The processing different from the processing according to the third exemplary embodiment is mainly described. In the present exemplary embodiment, a specification which allows the user to freely select a small area is taken as an example.

In step S2001, the image processing apparatus 100 acquires image data.

In step S2002, the estimation area setting unit 212 sets a rectangle area that surrounds an object area as an estimation area in the image data. In the present exemplary embodiment, the estimation area is set to each object when a plurality of objects is detected. Alternatively, an area that surrounds all of the detected objects is set as the estimation area.

In step S2003, the estimation area setting unit 212 sets a plurality of small areas to the estimation area set in step S2002. Alternatively, the processing in step S2002 may be omitted, and a plurality of small areas may be set by dividing the entire image data.

In step S2004, the PSF estimation unit 213 estimates a PSF for each small estimation area determined in step S2003.

In step S2005, the determination unit 214 displays a slider bar indicating a defocusing level, which is the degree of defocusing, on the display 204 together with the image.

In step S2006, the determination unit 214 selects a PSF corresponding to the defocusing level of the slider bar specified by the user.

FIG. 21 illustrates a state where small areas are changed in conjunction with a change of the defocusing level according to the present exemplary embodiment. When the user specifies the defocusing level, a small area from which a PSF corresponding to the defocusing level is estimated is highlighted, superimposed, and displayed on the image. In FIG. 21, the defocusing level increases as the slider bar is moved from the left side to the right side. In a diagram on the left side in FIG. 21, small areas superimposed on an object at the front regarded as an AF target of imaging operation are highlighted and displayed because the user specifies a low defocusing level. In a diagram on the right side in FIG. 21, small areas superimposed on an object in the back displayed at a position away from an in-focus position in the imaging operation are highlighted and displayed because the user specifies a high defocusing level. Alternatively, small areas from which PSFs corresponding to a specified defocusing level are estimated may be superimposed and displayed on the image.

When the user consecutively changes the defocusing level, a small area from which a PSF corresponding to the defocusing level is estimated is consecutively selected. Therefore, the user can easily understand similarity in the defocusing level between small areas and a magnitude of a difference in the defocusing level between the small areas.

A maximum value and a minimum value of the defocusing level expressed by the slider bar may be set as appropriate based on a maximum value and a minimum value of PSFs acquired from all of the small areas or based on a distribution of the PSFs. The defocusing level may be expressed by a numerical value, or words which express intensity levels, e.g., weak, normal, and strong, in addition to the position of the slider bar. Alternatively, the defocusing level may be specified by another operation member such as a button or a dial instead of a touch operation on the slider bar.

In step S2007, the determination unit 214 determines whether the user still changes the defocusing level. If the defocusing level is no longer changed (NO in step S2007), the processing proceeds to step S2008. If the defocusing level is still changed (YES in step S2007), the processing returns to step S2006. The determination may be made based on a time period for which the user does not change the defocusing level or based on whether the user inputs an instruction for specifying that the defocusing level is no longer changed.

In step S2008, based on the PSF common to the small areas corresponding to the defocusing level specified by the user, the signal processing unit 211 executes recovery processing for correcting defocusing by executing deconvolution processing on the image data.

In step S2009, the control circuit 201 displays an image on the display 204 by using the image data acquired by executing the deconvolution processing.

In step S2010, the determination unit 214 determines again whether an instruction for changing the defocusing level is input by the user. If the instruction for changing the defocusing level is received (YES in step S2010), the processing returns to step S2006. If the instruction for changing the defocusing level is not received (NO in step S2010), the processing proceeds to step S2011. If the user is not satisfied with a result of deconvolution processing executed based on the defocusing level selected in step S2006, the user can reselect the defocusing level and re-execute the deconvolution processing based on another defocusing level.

In step S2011, the control circuit 201 records the image data on which the deconvolution processing has been executed in the storage 205.

As described above, in the present exemplary embodiment, the degree of defocusing and the small area corresponding to the degree of defocusing are displayed in association with each other, so that the user can intuitively grasp the degree of defocusing of each area.

Next, a sixth exemplary embodiment will be described. In the present exemplary embodiment, a PSF is estimated by setting an estimation area to image data, and processing for calculating a score from the estimated PSF executed on a moving image.

In the present exemplary embodiment, the image processing apparatus 100 consecutively executes estimation processing of a PSF on the moving image, particularly, a live-view image, and displays the score of the PSF to the user to assist the user in capturing an image at a timing when deterioration thereof caused by defocusing is less noticeable.

Figure 22:
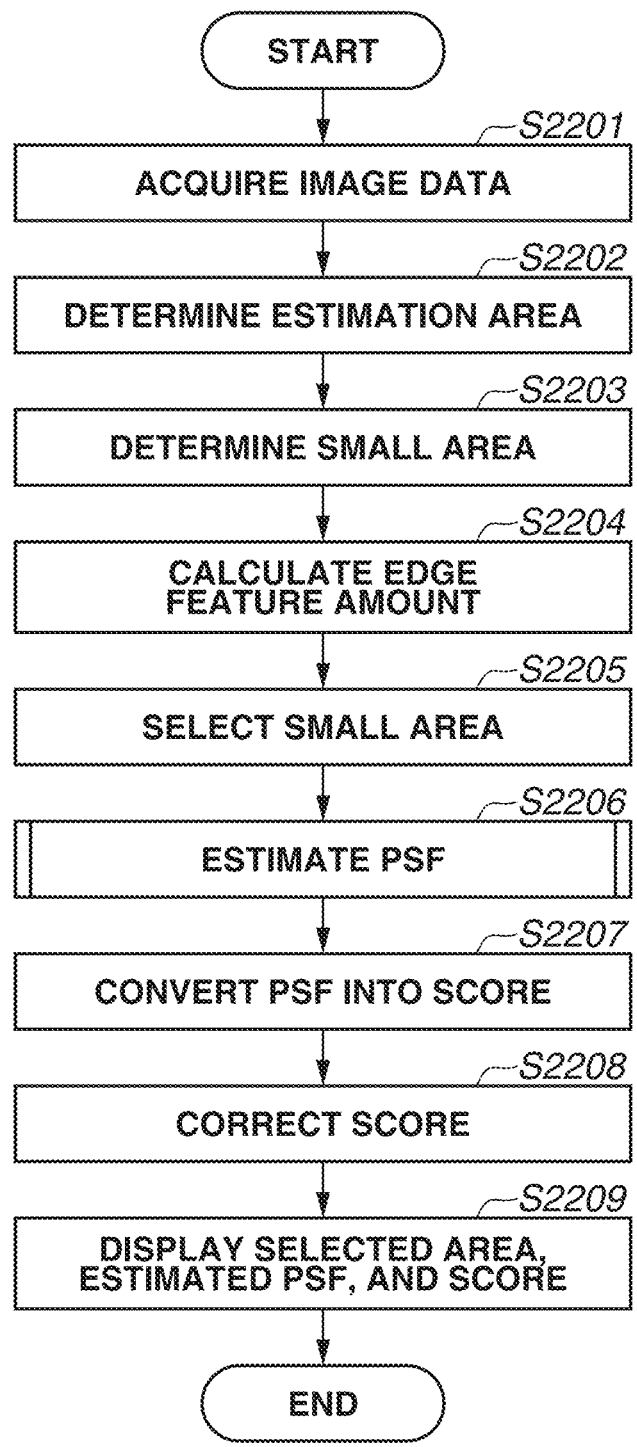
FIG. 22 is a flowchart illustrating processing relating to determination of defocusing of an image according to a sixth exemplary embodiment of the disclosure.

FIG. 22 is a flowchart illustrating processing relating to determination of defocusing of an image according to the present exemplary embodiment. The processing of the flowchart is executed for each frame.

In step S2201, the image processing apparatus 100 acquires image data used for a live-view moving image.

In step S2202, the estimation area setting unit 212 sets a rectangle area that surrounds a main object area as an estimation area in the image data.

In step S2203, the estimation area setting unit 212 sets a plurality of small areas in the estimation area set in step S2202.

In step S2204, based on intensity of an edge and deviation of an edge direction, the signal processing unit 211 calculates an edge feature amount for each small area.

In step S2205, the signal processing unit 211 selects a small area having an edge feature amount greater than a predetermined value as a small estimation area. In a case where the small area having the edge feature amount greater than the predetermined value does not exist, the processing in step S2205 and subsequent steps is not executed on image data of the frame, and the processing with respect to the image data of that frame is ended.

In step S2206, the PSF estimation unit 213 estimates a PSF common to a plurality of small estimation areas selected in step S2205.

In step S2207, by a method similar to the method employed in step S306 in FIG. 3, the determination unit 214 converts the calculated PSF into the score. Alternatively, a score of image data of the current frame may be calculated based on a score acquired from image data of a previous frame. For example, a result of averaging or weighted-addition of the scores of the image data of the current frame and a predetermined number of previous frames may be substituted for the score of the current frame.

In step S2208, by a method similar to the method employed in step S307 in FIG. 3, the determination unit 214 executes processing for correcting the score calculated in step S2207 based on various parameters of development processing.

In step S2209, the control circuit 201 superimposes one or both of the information indicating a degree of PSF estimated in step S2206 and the score acquired in step S2208 on a moving image, and displays the moving image on the display 204. Further, information which describes a small estimation area on which estimation processing of a PSF is executed may also be displayed thereon. As it is very difficult for the user to see the information if the information is displayed or updated for each frame, the information is displayed or updated at intervals sufficient for the user to easily see the information. Alternatively, the information may be updated or displayed when the score is changed to a value greater than or equal to the threshold, or when the degree of defocusing is less than the threshold.

FIGS. 23A and 23B are diagrams illustrating images of the live-view moving image displayed in step S2209.

In FIG. 23A, a plurality of small areas 2301, a calculation result 2302 of a PSF, and text 2303 describing an evaluation result of a score calculated from the PSF are superimposed and displayed on an image of one frame of the live-view moving image. Hatched areas of the plurality of small areas 2301 are the small estimation areas selected in step S2205, and the calculation result 2302 of the PSF represents a PSF common to these small estimation areas.

FIG. 23B illustrates a state where an object in the back is selected as a main object by an eye gaze detecting function. In FIG. 23B, an estimation area 2304, a calculation result 2305 of a PSF, and text 2306 describing an evaluation result of a score calculated from the PSF are superimposed and displayed on an image of one frame of the live-view moving image. In FIG. 23B, the estimation area 2304 is displayed because a small area having the edge feature amount greater than a predetermined value does not exist in step S2205. Therefore, the calculation result 2305 of the PSF represents a PSF acquired from the entire estimation area 2304.

As described above, the image processing apparatus 100 can assist the user in capturing a live-view moving image while checking the degree of defocusing of an object, and can also assist the user in capturing a still image at a timing when defocusing of the object is suppressed.

The disclosure can be realized through processing in which a program for implementing one or more functions according to the above-described exemplary embodiments is supplied to a system or an apparatus via a network or a storage medium, and one or more processors in the system or the apparatus read and execute the program. Further, the aspect of the embodiments can also be realized with a circuit (e.g., application specific integrated circuit (ASIC)) that executes the one or more functions.

The disclosure is not limited to the contents of the above-described exemplary embodiments, and various changes and modifications are possible without departing from a spirit and a scope of the disclosure.

According to the disclosure, it is possible to provide an image processing apparatus which allows a user to appropriately and easily evaluate an image having defocusing.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-082168, filed May 14, 2021, which is hereby incorporated by reference herein in its entirety.

What is claimed is:

1. An apparatus comprising:
   at least one memory configured to store instructions; and
   at least one processor in communication with the at least one memory and configured to execute the instructions to:
   set an estimation area to acquired image data;
   execute calculation for estimating a degree of defocusing of an image in the estimation area;
   determine defocusing of the image data based on the estimated degree of defocusing;
   display information which allows a user to adjust a threshold for determining defocusing on a display;
   determine defocusing of the image data by converting the estimated degree of defocusing into a score and comparing the score with the threshold; and
   correct at least one of the score and the threshold depending on a parameter of image processing executed on the image data.

2. The apparatus according to claim 1, wherein the at least one processor further executes instructions to display information for continuously adjusting the threshold for determining defocusing on the display.

3. The apparatus according to claim 2, wherein the at least one processor further executes instructions to set at least one of a maximum value and a minimum value described in the information for continuously adjusting the threshold for determining defocusing based on a plurality of pieces of image data.

4. The apparatus according to claim 3, wherein the at least one processor further executes instructions to set at least one of the maximum value and the minimum value based on an analysis result of image data corresponding to a plurality of images displayed on the display.

5. The apparatus according to claim 4, wherein the at least one processor further executes instructions to set at least one of the maximum value and the minimum value based on a degree of defocusing included in the plurality of images displayed on the display.

6. The apparatus according to claim 1, wherein the at least one processor further executes instructions to change the threshold for determining defocusing depending on an output size of the image data.

7. The apparatus according to claim 1, wherein the at least one processor further executes instructions to correct at least one of the score and the threshold to cause presence of defocusing to be easily determined in a case where the image processing executed on the image data is processing which increases a level of an edge.

8. The apparatus according to claim 1, wherein the at least one processor further executes instructions to display an image based on the image data, the estimation area being superimposed on the image, on the display.

9. The apparatus according to claim 1, wherein the at least one processor further executes instructions to acquire the image data from a frame included in a partial section of image data of a moving image.

10. The apparatus according to claim 1, wherein the at least one processor further executes instructions to generate a point spread function of the image and to estimate the degree of defocusing of the image by using the point spread function.

11. A method comprising:
    setting an estimation area to acquired image data;
    executing calculation for estimating a degree of defocusing of an image in the estimation area;
    determining defocusing of the image data based on the estimated degree of defocusing;
    displaying information which allows a user to adjust a threshold for determining defocusing on a display;
    determining defocusing of the image data by converting the estimated degree of defocusing into a score and comparing the score with the threshold; and
    correcting at least one of the score and the threshold depending on a parameter of image processing executed on the image data.

12. A non-transitory computer-readable storage medium which stores a program for causing a computer of an apparatus to execute a method comprising:
    setting an estimation area to acquired image data;
    executing calculation for estimating a degree of defocusing of an image in the estimation area;
    determining defocusing of the image data based on the estimated degree of defocusing;
    displaying information which allows a user to adjust a threshold for determining defocusing on a display;
    determining defocusing of the image data by converting the estimated degree of defocusing into a score and comparing the score with the threshold; and correcting at least one of the score and the threshold depending on a parameter of image processing executed on the image data.

\* \* \* \* \*